United States Patent
Matsuo et al.

(10) Patent No.: US 7,046,532 B2
(45) Date of Patent: May 16, 2006

(54) SWITCHING POWER SUPPLY

(75) Inventors: Mitsuhiro Matsuo, Osaka (JP); Koji Yoshida, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 177 days.

(21) Appl. No.: 10/765,745

(22) Filed: Jan. 27, 2004

(65) Prior Publication Data
US 2004/0233685 A1  Nov. 25, 2004

(30) Foreign Application Priority Data
Feb. 6, 2003  (JP) .............................. 2003-030075

(51) Int. Cl.
  *H02M 3/335* (2006.01)
(52) U.S. Cl. ........................ 363/65; 363/17; 363/21.01
(58) Field of Classification Search ................... 363/16, 363/17, 20, 21.01, 21.04, 21.08, 21.09, 56.02, 363/65, 97, 98, 131, 132

See application file for complete search history.

(56) References Cited

U.S. PATENT DOCUMENTS

| | | | | | |
|---|---|---|---|---|---|
| 5,513,094 | A | * | 4/1996 | Stanley | 363/98 |
| 5,682,303 | A | * | 10/1997 | Goad | 363/71 |
| 5,883,797 | A | * | 3/1999 | Amaro et al. | 363/65 |
| 5,946,206 | A | * | 8/1999 | Shimizu et al. | 363/65 |
| 6,574,124 | B1 | * | 6/2003 | Lin et al. | 363/65 |
| 6,809,678 | B1 | * | 10/2004 | Vera et al. | 341/166 |

FOREIGN PATENT DOCUMENTS

| | | |
|---|---|---|
| JP | 62138061 A | 6/1987 |
| JP | 62210861 A | 9/1987 |

* cited by examiner

*Primary Examiner*—Matthew V. Nguyen
(74) *Attorney, Agent, or Firm*—Akin Gump Strauss Hauer & Feld, LLP

(57) ABSTRACT

A switching power supply wherein output voltage error detecting means detects the output voltage of DC-DC converters and generates an error signal, input voltage deviation detecting means detects voltages corresponding to the input voltages of the DC-DC converters to generate a deviation signal, and control means receives the error signal of the output voltage error detecting means and the deviation signal of the input voltage deviation detecting means and controls the driving of the DC-DC converters.

12 Claims, 12 Drawing Sheets

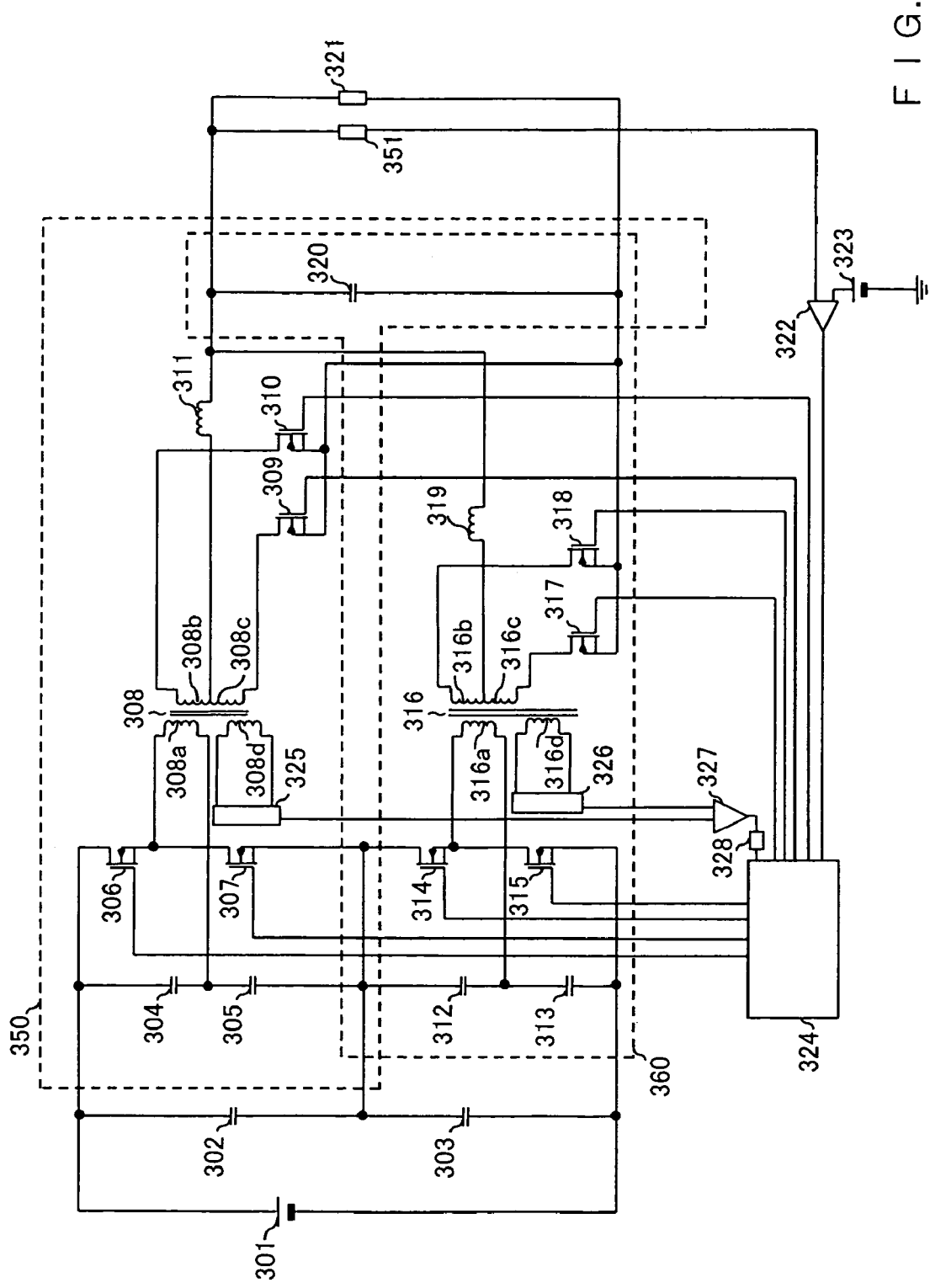
F I G. 1

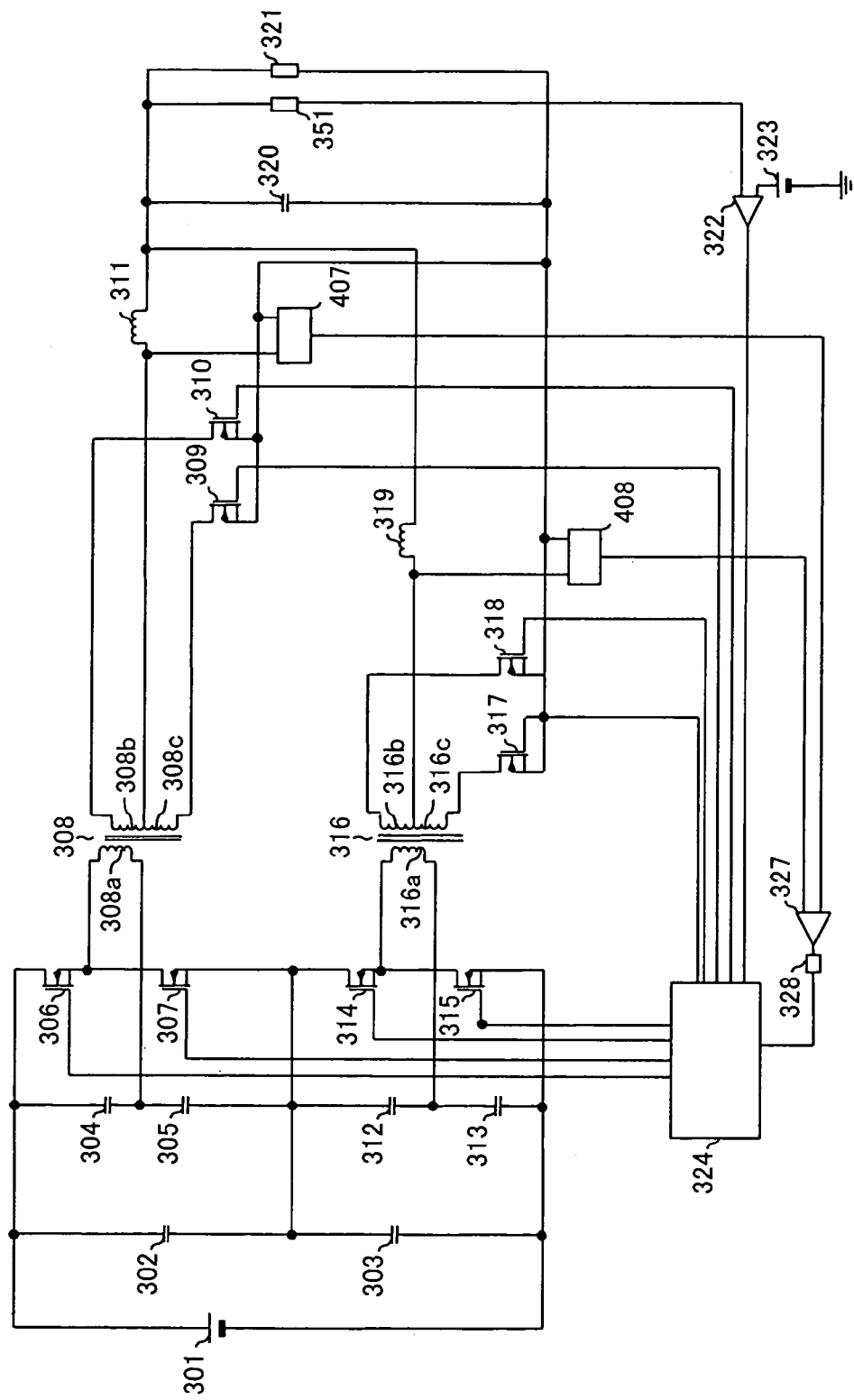
F I G. 7

SWITCHING POWER SUPPLY

BACKGROUND OF THE INVENTION

The present invention relates to a switching power supply for supplying a stabilized DC voltage to industrial and consumer electronic appliances. More particularly, the present invention relates to improvements in the control stability of the DC-DC converter of a switching power supply.

In recent years, as electronic appliances are made more inexpensive, compact, efficient and energy saving, switching power supplies having high output stability and being compact and efficient are demanded strongly. In particular, in the case of power supplies for supplying electric power to semiconductor devices, as semiconductor devices are made more highly integrated, power supplies having higher stability at a lower voltage and capable of supplying a larger current are demanded strongly.

FIGS. 11A, 11B, 11C and 11D are circuit diagrams showing various configuration examples of DC-DC converters in conventional switching power supplies. FIG. 11A shows a forward-type DC-DC converter, FIG. 11B shows a flyback-type DC-DC converter, FIG. 11C shows a half-bridge-type DC-DC converter, and FIG. 11D shows a full-bridge-type DC-DC converter. In the forward-type DC-DC converter shown in FIG. 11A, numeral 100 designates an input DC power supply, and the series circuit of the primary winding 102a of a transformer 102 and a main switching device 101 is connected across the input DC power supply 100. The series circuit of rectifier diodes 103 and 104 is connected across the secondary winding 102b of the transformer 102, and one end of a rectifier choke coil 105 is connected to the connection point of the two rectifier diodes 103 and 104. The other end of the rectifier choke coil 105 is connected to one end of a smoothing capacitor 106. Both ends of the smoothing capacitor 106 are used as output terminals, and a load 107 is connected across the terminals. The output voltage supplied to the load 107 is detected by an output voltage detection circuit 111 and output to an error amplifier 109. The error amplifier 109 compares the output voltage with a reference voltage from an output voltage setting reference power supply 110, amplifies an error signal therebetween and outputs the error signal to a control circuit 108. The control circuit 108 carries out the ON/OFF control of the main switching device 101 on the basis of the error signal.

In the flyback-type DC-DC converter shown in FIG. 11B, components having the same functions and configurations as those of the forward-type DC-DC converter shown in FIG. 11A are designated by the same numerals. The flyback-type DC-DC converter shown in FIG. 11B has a configuration wherein the rectifier diode 104 and the rectifier choke coil 105 in the forward-type DC-DC converter shown in FIG. 11A are eliminated.

In the half-bridge-type DC-DC converter shown in FIG. 11C, numeral 120 designates an input DC power supply, and the series circuit of two capacitors 121 and 122 is connected across the input DC power supply 120. In addition, the series circuit of two main switching devices 123 and 124 is connected in parallel with the series circuit of the capacitors 121 and 122. In this case, MOSFETs are taken as examples of the main switching devices 123 and 124. The primary winding 125a of a transformer 125 is connected between the connection point of the two capacitors 121 and 122 and the connection point of the two main switching devices 123 and 124. The transformer 125 has a first secondary winding 125b and a second secondary winding 125c, and these windings are connected to rectifier switching devices 126 and 127, respectively. One end of an output choke coil 128 is connected to the connection point of the first secondary winding 125b and the second secondary winding 125c, and the other end of the output choke coil 128 is connected to a smoothing capacitor 129. Both ends of the smoothing capacitor 129 are used as output terminals, and a load 130 is connected across the ends. The output voltage supplied to the load 130 is detected by an output voltage detection circuit 134 and output to an error amplifier 132. The error amplifier 132 compares the output voltage with a reference voltage from an output voltage setting reference power supply 133, amplifies an error signal therebetween and outputs the error signal to a control circuit 131. The control circuit 131 carries out the ON/OFF control of the main switching devices 123 and 124 on the basis of the error signal.

In the full-bridge-type DC-DC converter shown in FIG. 11D, components having the same functions and configurations as those of the half-bridge-type DC-DC converter shown in FIG. 11C are designated by the same numerals. In the full-bridge-type DC-DC converter shown in FIG. 11D, instead of the capacitors 121 and 122 in the half-bridge-type DC-DC converter shown in FIG. 11C, main switching devices 135 and 136 that are ON/OFF controlled by a control circuit 131 are provided. By the ON/OFF operation of the main switching devices 135 and 136, a high-frequency voltage is generated in the primary winding 125a of a transformer 125. Hence, a high-frequency voltage corresponding to the turns ratio of the primary winding 125a and a secondary winding 125b is generated in the secondary winding 125b, and a high-frequency voltage corresponding to the turns ratio of the primary winding 125a and a secondary winding 125c is generated in the secondary winding 125c. In the full-bridge-type DC-DC converter shown in FIG. 11D, the voltages are rectified by rectifier switching devices 126 and 127 and smoothened by an output smoothing circuit comprising a reactor 128 and a capacitor 129 to obtain a DC voltage, and the DC voltage is supplied to a load 130. In addition, the output DC voltage is detected by an output voltage detection circuit 134 and input to one of the input terminals of an error amplifier 132. The reference voltage from a reference power supply 133 is input to the other input terminal of the error amplifier 132, and the output DC voltage is compared with the reference voltage by the error amplifier 132. A PWM pulse signal depending on the result of the comparison is supplied from the control circuit 131 serving as a pulse generator to the main switching devices, whereby the main switching devices are turned ON/OFF. As a result, a stabilized DC voltage is supplied to the load 130.

In conventional switching power supplies, a method of connecting a plurality of switching power supplies in series is used to make the capacity larger or to make the circuit components smaller and lighter. More specifically, power supplies for operating semiconductor devices are designed to supply a lower voltage and a larger current while the pattern lines of semiconductor devices, such as large-scale integrated circuits (LSI) and microprocessors (MPU), are made finer. In particular, in the case when the voltage step-down ratio between the input and output voltages is large, for example, in the case when the input voltage is 48 V and the output voltage is 1.2 V, the turns ratio of the transformer increases inevitably. In addition, in a switching power supply having this kind of configuration, when the amount of the output current increases, the losses in the windings of the transformer also increase. This results in making the switching power supply lower in efficiency and larger in size.

In the case when DC-DC converters serving as a plurality of switching power supplies are connected in series, an input DC voltage is divided by a plurality of capacitors. The divided voltages are used as power supplies, and the DC-DC converters are respectively connected to the power supplies. These DC-DC converters are ON/OFF controlled by PWM signals supplied from a control circuit, whereby a desired DC voltage is generated on the output sides connected in parallel. Conventional examples comprising a plurality of switching power supply circuits connected in series are shown in FIGS. 12A and 12B. FIGS. 12A and 12B show circuit examples of conventional switching power supplies wherein DC-DC converters serving as a plurality of switching power supply circuits are connected in series on the input sides thereof. The circuit diagram shown in FIG. 12A is a schematic diagram showing a switching power supply formed of half-bridge-type or full-bridge-type DC-DC converters. The circuit diagram shown in FIG. 12B is a schematic diagram showing switching a power supply formed of forward-type or flyback-type DC-DC converters.

In FIGS. 12A and 12B, an input DC voltage of an input DC power supply 201 is divided by two voltage-dividing capacitors 202 and 203, and the divided DC voltages are input to two DC-DC converters 204 and 205, respectively. The outputs from the DC-DC converters 204 and 205 are smoothened by a smoothing capacitor 206 and supplied to a load 207. As described above, the input DC voltage is divided by the capacitors 202 and 203, and the divided voltages, used as power supplies, are input to the DC-DC converters 204 and 205, respectively. The DC-DC converters, the output sides of which are connected in parallel, are configured so as to supply a desired output voltage to the load 207.

However, in the conventional switching power supplies configured as shown in FIGS. 12A and 12B, deviations occur in the circuit constants and in the operations of the main switching devices in reality. As a result, in each of the DC-DC converters, the balance of the input voltages of the DC-DC converters is lost, and a load imbalance occurs in some cases. If this kind of load imbalance becomes large, the usage conditions of the main switching devices are adversely affected, and the switching power supply cannot carry out its function in some cases. Therefore, an object to be attained in this field is to provide a switching power supply capable of carrying out stable operation without causing the above-mentioned problems.

As switching power supplies developed to attain such an object, the switching power supplies disclosed in Official Gazette of Japanese Unexamined Patent Publication No. Sho 62-138061 and Official Gazette of Japanese Examined Patent Publication No. Hei 4-1589 are available.

Official Gazette of Japanese Unexamined Patent Publication No. Sho 62-138061 has disclosed a switching regulator power supply wherein the input sides of a plurality of high-frequency inverter circuits are connected in series. In this switching regulator power supply, applied voltages are balanced to prevent two switching devices from breaking. For this purpose, in the switching power supply, each of the high-frequency inverter circuits is operated at an opposite phase, and the choke coil on the output side is used in common, whereby the difference in impedance between the high-frequency inverter circuits is eliminated.

In addition, Official Gazette of Japanese Examined Patent Publication No. Hei 4-1589 has disclosed a method wherein the voltage target value to be shared by each capacitor connected to the input side of each of a plurality of DC-DC converters is determined, the voltage applied to each capacitor is detected, and control is carried out so that the deviation between the two voltage values becomes zero.

However, in the switching power supply disclosed in Official Gazette of Japanese Unexamined Patent Publication No. Sho 62-138061, if the constants of the components in the high-frequency inverter circuits other than the choke coils have variations, a difference occurs in load sharing. As a result, there is a fear of making its operation as a power supply unstable.

Furthermore, in the switching regulator power supply disclosed in Official Gazette of Japanese Unexamined Patent Publication No. Sho 62-138061, to which a high voltage is input, the voltages of each high-frequency inverter circuit are balanced so that the semiconductor devices constituting the high-frequency inverter circuits serving as switching devices are prevented from being broken by the application of voltages exceeding the withstand voltages of the devices. However, in the case of the configuration disclosed in Official Gazette of Japanese Unexamined Patent Publication No. Sho 62-138061, the input voltage is required to be divided by resistors when the voltage target value is set. Hence, a power loss occurs at the time of voltage detection, and efficiency is lowered.

In the series operation system for the DC-DC converters disclosed in Official Gazette of Japanese Examined Patent Publication No. Hei. 4-1589, the target value is adjusted so as to be a voltage value to be shared by each capacitor. However, since the components of the DC-DC converters have variations in their characteristics, the output states of the circuits are unbalanced.

BRIEF SUMMARY OF THE INVENTION

In order to solve the problems encountered in the above-mentioned conventional switching power supplies, the present invention is intended to make load sharing uniform by connecting the input sides of a plurality of DC-DC converters in series, by making the input voltages of the DC-DC converters uniform and by using circuit components being inexpensive in price and low in power loss.

In order to attain the above-mentioned object, the switching power supply in accordance with the present invention comprises:

a plurality of capacitors for dividing the voltage of a DC power supply, a plurality of DC-DC converters, the input sides of which respectively receive the voltages divided by the plurality of capacitors and the output sides of which are connected in parallel, output voltage error detecting means for detecting the output voltage of the above-mentioned DC-DC converters and for generating an error signal between the output voltage and a reference voltage, input voltage deviation detecting means for detecting voltages corresponding to the input voltages of the DC-DC converters and for generating the deviation signal of the input voltages of the DC-DC converters, and control means, receiving the error signal from the above-mentioned output voltage error detecting means and the deviation signal from the above-mentioned input voltage deviation detecting means, for drive-controlling the above-mentioned DC-DC converters.

The switching power supply in accordance with the present invention is configured so that the voltage of the DC power supply is divided by the capacitors accurately and uniformly and applied to the DC-DC converters. In addition, in the present invention, the divided voltages are detected indirectly, and the input voltages of the DC-DC converters are monitored. Hence, the imbalance of load current due to the imbalance of the input voltages of the DC-DC converters is prevented, whereby control is prevented from becoming unstable. With the present invention, since the input voltages of the DC-DC converters can be reduced, the turns ratio of the primary winding of the transformer thereof can be reduced, and the withstand voltage of the switching device thereof serving as switching means can be lowered. Since the numbers of turns of the transformer can be reduced in the switching power supply having a large voltage step-down between the input and output in accordance with the present invention, the circuit configuration of the present invention is effective for apparatuses requiring large current output and apparatuses limited in shape and size.

In the switching power supply in accordance with the present invention, the input voltage deviation detecting means comprises voltage detecting means for detecting the voltages applied to predetermined portions of the DC-DC converters and voltage deviation detecting means for detecting the deviation of the input voltages of the DC-DC converters detected by the above-mentioned voltage detecting means, and the control means, receiving the deviation signal of the above-mentioned input voltage deviation detecting means and the error signal of the above-mentioned output voltage error detecting means, for correcting drive signals for ON/OFF operating the switching means so that the input voltages to the DC-DC converters are balanced and so that the deviation of the above-mentioned input voltage deviation detecting means becomes zero. In the switching power supply in accordance with the present invention configured as described above, the voltages obtained by dividing the voltage of the DC power supply are detected indirectly, and the input voltages of the DC-DC converters are monitored. Hence, the imbalance of load current due to the imbalance of the input voltages of the DC-DC converters is prevented, whereby control is prevented from becoming unstable.

In the switching power supply in accordance with the present invention, comprising N (N: an integer of 3 or more) capacitors connected in series across the input ends, across which the DC power supply is connected, and N DC-DC converters respectively connected to the above-mentioned capacitors, the input voltage deviation detecting means detects voltages corresponding to the input voltages of the DC-DC converters, calculates the average value thereof and generates a deviation between the average value and the voltages corresponding to the input voltages of the DC-DC converters, and the control means, receiving the deviation signal of the above-mentioned input voltage deviation detecting means and the error signal of the output voltage error detecting means, for correcting drive signals for ON/OFF operating the above-mentioned switching means so that the input voltages to the DC-DC converters are balanced and so that the deviation of the above-mentioned input voltage deviation detecting means becomes zero. In the switching power supply in accordance with the present invention configured as described above, three or more DC-DC converters are connected in series on the input side, and the deviation among the DC-DC converters is obtained securely. Hence, the imbalance of load current due to the imbalance of the input voltages of the DC-DC converters is prevented, whereby control is prevented from becoming unstable.

In the switching power supply in accordance with the present invention, the input voltage deviation detecting means detects voltages induced in auxiliary windings added to the transformers at the time when the switching means are in the ON state. In the switching power supply in accordance with the present invention configured as described above, the auxiliary windings are added to the transformers, whereby the voltages applied to the primary windings of the transformers can be detected and the input voltages of the DC-DC converters can be detected. Hence, in the-switching power supply in accordance with the present invention, the imbalance of load current due to the imbalance of the input voltages of the DC-DC converters connected in series is prevented, whereby stable circuit operation can be maintained.

In the switching power supply in accordance with the present invention, the input voltage deviation detecting means detects voltages induced in the secondary windings of the transformers. In the switching power supply in accordance with the present invention configured as described above, the input voltages of the DC-DC converters are detected from the amplitude values of the voltages induced in the secondary windings of the transformers, the deviation of the input voltages is calculated, and the voltages are balanced. Hence, the imbalance of load current due to the imbalance of the input voltages of the DC-DC converters can be prevented.

In the switching power supply in accordance with the present invention, the input voltage deviation detecting means detects voltages applied to output choke coils. In the switching power supply in accordance with the present invention configured as described above, the voltages induced in the output choke coils of the DC-DC converters are detected, whereby the voltages input to the DC-DC converters can be detected indirectly. Furthermore, drive signals for ON/OFF operating the switching means can be controlled by using the detected voltages in the present invention.

In the switching power supply in accordance with the present invention, the control means comprises reference triangular signal generating means for generating a reference triangular signal and voltage comparing means for comparing the above-mentioned reference triangular signal with the error signal of the output voltage error detecting means, and the deviation signal of the input voltage deviation detecting means is added to the reference triangular signal or the error signal of the above-mentioned output voltage error detecting means and compared in voltage.

In the switching power supply in accordance with the present invention, the DC-DC converter has at least switching means, an isolating transformer, rectifying means, a smoothing capacitor and an output choke coil, and the above-mentioned rectifying means comprises diodes.

In the switching power supply in accordance with the present invention, the DC-DC converter is formed of one of a forward-type converter, a flyback-type converter, a half-bridge-type converter and a full-bridge-type converter. The switching power supply in accordance with the present invention configured as described above comprises one of a forward-type converter, a flyback-type converter, a half-bridge-type converter and a full-bridge-type converter, each known as an isolating converter. Since isolating transformers are used, the input voltages can be detected easily by detecting the voltages induced in the isolating transformers, whereby accurate control can be carried out easily.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is a circuit diagram showing the configuration of a switching power supply in accordance with Embodiment 1 of the present invention;

FIG. 7 is a circuit diagram showing the configuration of a switching power supply in accordance with Embodiment 4 of the present invention;

Figure 2:
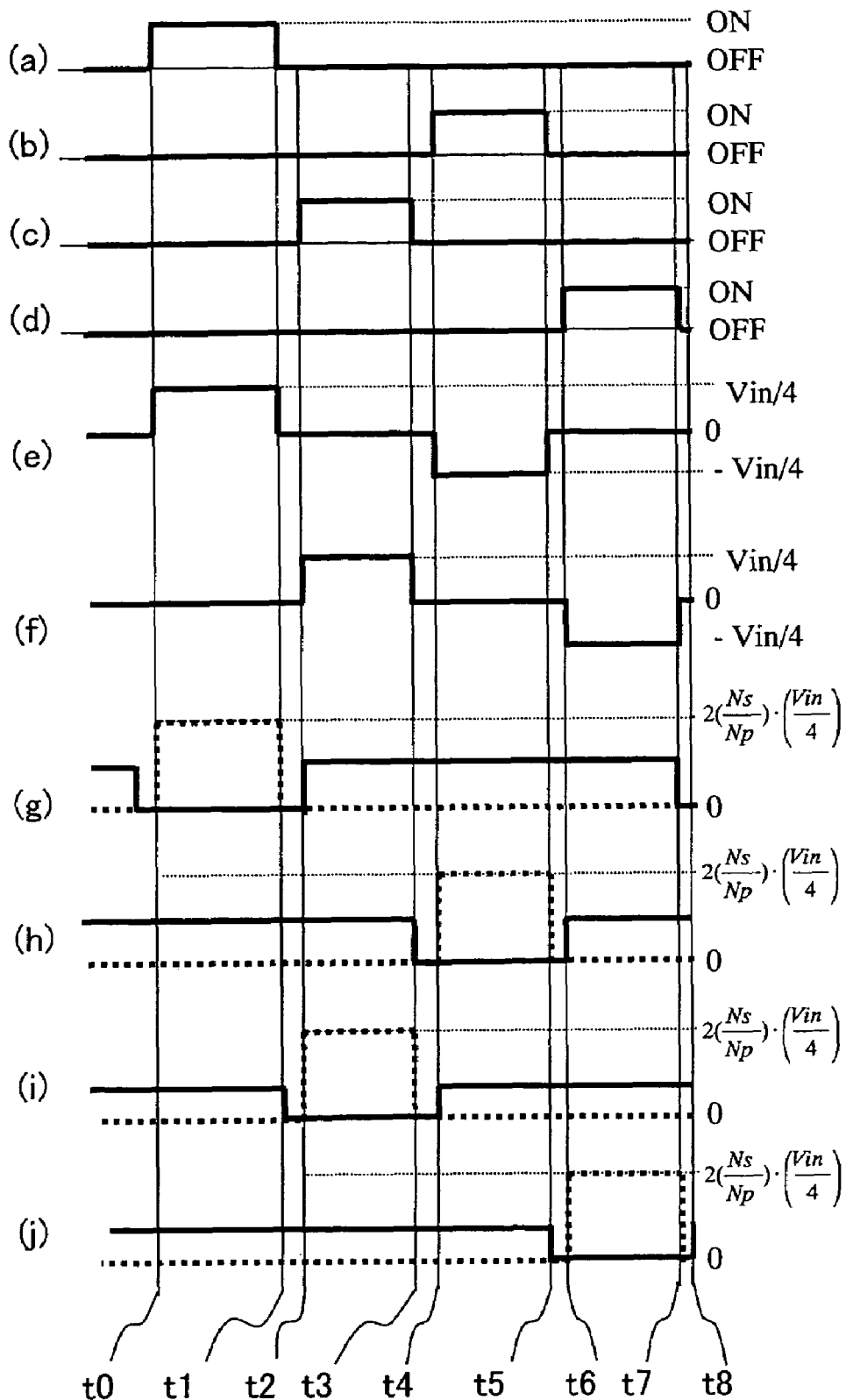
FIG. 2 is a diagram showing the waveforms of signals during the operation of the switching power supply in accordance with Embodiment 1.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a switching power supply in accordance with the present invention will be described below referring to the accompanying drawings.

EMBODIMENT 1

FIG. 1 is a circuit diagram showing the configuration of a switching power supply in accordance with Embodiment 1 of the present invention. In the switching power supply in accordance with Embodiment 1 shown in FIG. 1, the input sides of two half-bridge-type DC-DC converters (hereafter simply referred to as half-bridge converters) 350 and 360 are connected in series, and the output sides thereof are connected in parallel. In other words, in the switching power supply in accordance with Embodiment 1, two capacitors 302 and 303 are connected in series to divide the voltage of a DC power supply 301, and the divided voltages are applied to the first half-bridge converter 350 and the second half-bridge converter 360, respectively. In the case when the two DC-DC converters are a half-bridge type, the capacitors 302 and 303 can be omitted. This is because, in the circuit configuration of the half-bridge type, capacitors 304, 305, 312 and 313 are provided to carry out voltage division.

In the first half-bridge converter 350, the series circuit of the two capacitors 304 and 305 is connected in parallel with the capacitor 302. In addition, the series circuit of first and second switching devices 306 and 307 is connected in parallel with the series circuit of the capacitors 304 and 305. MOSFETs are herein taken as examples of the first and second switching devices 306 and 307. The primary winding 308a of a first transformer 308 is connected between the connection point of the two capacitors 304 and 305 and the connection point of the first and second switching devices 306 and 307. The first transformer 308 has the primary winding 308a, a first secondary winding 308b, a second secondary winding 308c and an auxiliary winding 308d. The first secondary winding 308b and the second secondary winding 308c of the first transformer 308 are connected to fifth and sixth switching devices 309 and 310 serving as rectifier switching means, respectively. One end of an output choke coil 311 is connected to the connection point of the first secondary winding 308b and the second secondary winding 308c, and the other end of the output choke coil 311 is connected to a smoothing capacitor 320. Both ends of the smoothing capacitor 320 serve as output terminals, and a load 321 is connected across the terminals. The output voltage supplied to the load 321 is detected by an output voltage detection circuit 351 serving as output voltage detecting means and output to an output voltage error amplifier 322. The output voltage error amplifier 322 compares the output voltage with the reference voltage from an output voltage setting reference power supply 323, amplifies the error signal therebetween and outputs the error signal to a control circuit 324 serving as control means.

In the second half-bridge converter 360, the series circuit of two capacitors 312 and 313 is connected in parallel with the capacitor 303. In addition, the series circuit of third and fourth switching devices 314 and 315 is connected in parallel with the series circuit of the capacitors 312 and 313. MOSFETs are herein taken as examples of the third and fourth switching devices 314 and 315. A primary winding 316a of a second transformer 316 is connected between the connection point of the two capacitors 312 and 313 and the connection point of the third and fourth switching devices 314 and 315. The second transformer 316 has the primary winding 316a, a first secondary winding 316b, a second secondary winding 316c and an auxiliary winding 316d. The first secondary winding 316b and the second secondary winding 316c of the second transformer 316 are connected to seventh and eighth switching devices 317 and 318 serving as rectifier switching means, respectively. One end of an output choke coil 319 is connected to the connection point of the first secondary winding 316b and the second secondary winding 316c, and the other end of the output choke coil 319 is connected to the smoothing capacitor 320.

As described above, the smoothing capacitor 320 is shared in the first half-bridge converter 350 and the second half-bridge converter 360. In other words, the output terminals of the first half-bridge-converter 350 and the second half-bridge converter 360 are connected in parallel, and DC power is supplied to the load 321.

The voltage generated across the auxiliary winding 308d of the first transformer 308 is detected by a first voltage detection circuit 325 serving as voltage detecting means and input to a voltage deviation detection circuit 327 serving as voltage deviation detecting means. In addition, the voltage generated across the auxiliary winding 316d of the second transformer 316 is detected by a second voltage detection circuit 326 serving as voltage detecting means and input to the voltage deviation detection circuit 327. The voltage deviation detection circuit 327 compares the voltage detected by the first voltage detection circuit 325 with the voltage detected by the second voltage detection circuit 326, and outputs the result of the comparison to the control circuit 324 via a voltage signal correction circuit 328.

The error signal amplified by the output voltage error amplifier 322 and the voltage signal indicating the result of the comparison between the output voltage of the first voltage detection circuit 325 and the output voltage of the second voltage detection circuit 326 are input to the control circuit 324. The control circuit 324 carries out the ON/OFF control of the switching devices 306, 307, 309, 310, 314, 315, 317 and 318 on the basis of these signals.

The output voltage detection circuit 351 for detecting the output voltage, the output voltage setting reference power supply 323, the output voltage error amplifier 322 for obtaining the deviation between the output voltage and the reference voltage of the output voltage setting reference power supply 323 and drive signal generating means, described later, for generating drive signals for ON/OFF driving the switching devices by using the error signal captured from the output voltage error amplifier 322 into the control circuit 324 are provided and used to set the output voltage.

FIG. 2 shows the waveforms of signals during the operation of the switching power supply in accordance with Embodiment 1. In FIG. 2, a part (a) indicates the drive signal for the first switching device 306, a part (b) indicates the drive signal for the second switching device 307, a part (c) indicates the drive signal for the third switching device 314, a part (d) indicates the drive signal for the fourth switching device 315, a part (e) indicates the waveform of the voltage applied to the primary winding 308a of the first transformer 308, and a part (f) indicates the waveform of the voltage applied to the primary winding 316a of the second transformer 316. In addition, in FIG. 2, the solid line in a part (g) indicates the drive signal (gate drive signal) input to the gate end of the fifth switching device 309, and the broken line indicates the waveform of the voltage applied across both terminals of the fifth switching device 309. The solid line in a part (h) of FIG. 2 indicates the drive signal (gate drive signal) input to the gate end of the sixth switching device 310, and the broken line indicates the waveform of the voltage applied across both terminals of the sixth switching device 310. The solid line in a part (i) of FIG. 2 indicates the drive signal (gate drive signal) input to the gate end of the seventh switching device 317, and the broken line indicates the waveform of the voltage applied across both terminals of the seventh switching device 317. The solid line in a part (j) of FIG. 2 indicates the drive signal (gate drive signal) input to the gate end of the eighth switching device 318, and the broken line indicates the waveform of the voltage applied across both terminals of the eighth switching device 318.

The circuit operation during the period from time t0 to time t8 shown in FIG. 2 will be described below in time divisions.

<Time Division t0 to t1>

When the gate drive signal indicated in the part (a) of FIG. 2 is applied to the first switching device 306, the first switching device 306 is turned ON at time t0. Hence, a voltage corresponding to a quarter (Vin/4) [V] of the input voltage Vin [V] of the DC power supply 301 is applied across both ends of the primary winding 308a of the first transformer 308. The voltage of (Vin/4) [V] is determined by the capacitors 304, 305, 312 and 313. At this time, the fifth switching device 309 has already been turned OFF by the gate drive signal as indicated in the part (g) of FIG. 2. Hence, when it is assumed that the number of turns of the primary winding 308a of the first transformer 308 is Np and that the number of turns of the first secondary winding 308b is Ns, a rectangular voltage having an amplitude value of 2(Vin/4)·(Ns/Np) [V] is applied to the first secondary winding 308b of the first transformer 308. The number of turns of the second secondary winding 308c is also Ns.

<Time Division t1 to t2>

When the gate drive signal indicated in the part (a) of FIG. 2 is applied to the first switching device 306 at time t1, the first switching device 306 is turned OFF. Hence, the voltage across both ends of the primary winding 308a of the first transformer 308 drops to 0 [V]. At this time, the voltage across both ends of the primary winding 316a of the second transformer 316 remains 0 [V]. In addition, since the first switching device 306 is turned OFF, the voltage applied across both ends of the first secondary winding 316b of the second transformer 316 drops to 0 [V]. Furthermore, at time t1, the seventh switching device 317 is turned OFF by the gate drive signal indicated in the part (i) of FIG. 2.

<Time Division t2 to t3>

At time t2, the third switching device 314 is turned ON by the gate drive signal indicated in the part (c) of FIG. 2, and the fifth switching device 309 is turned ON by the gate drive signal indicated in the part (g) of FIG. 2. Hence, a voltage-having an amplitude value of (Vin/4) [V] is applied across both ends of the primary winding 316a of the second transformer 316. Since the seventh switching device 317 has already been turned OFF at this time, a rectangular voltage having an amplitude value of 2(Vin/4)·(Ns/Np) [V] is applied to the seventh switching device 317.

<Time Division t3 to t4>

At time t3, the third switching device 314 is turned OFF by the gate drive signal indicated in the part (c) of FIG. 2, and the sixth switching device 310 is turned OFF by the gate drive signal indicated in the part (h) of FIG. 2. At this time, the voltage applied across both ends of the primary winding 316a of the second transformer 316 drops to 0 [V]. Similarly, the voltage across both ends of the first secondary winding 316b of the second transformer 316 becomes 0 [V].

<Time Division t4 to t5>

The second switching device 307 and the seventh switching device 317 are turned ON at time t4 by the gate drive signals indicated in the part (b) and the part (i) of FIG. 2. Hence, a voltage having an amplitude value of −(Vin/4) [V] is applied across both ends of the primary winding 308a of the first transformer 308. Since the sixth switching device 310 has already been turned OFF at this time, a rectangular voltage having an amplitude value of 2(Vin/4)·(Ns/Np) [V]

is applied across both ends of the second secondary winding 308*c* of the first transformer 308.

<Time Division t5 to t6>

The second switching device 307 and the eighth switching device 318 are turned OFF at time t5 by the gate drive signals indicated in the part (b) and the part (j) of FIG. 2. Hence, a voltage having an amplitude value of (Vin/4) [V] is induced on the primary winding 308*a* of the first transformer 308. In addition, since the second switching device 307 is turned OFF, the voltage across both ends of the primary winding 308*a* of the first transformer 308 becomes 0 [V], whereby the voltage across both ends of the second secondary winding 308*c* becomes 0 [V].

Furthermore, at time t5, the eighth switching device 318 is turned OFF.

<Time Division t6 to t7>

The sixth switching device 310 and the fourth switching device 315 are turned ON at time t6 by the gate drive signals indicated in the part (d) and the part (h) of FIG. 2. Hence, a voltage of −(Vin/4) [V] is applied across both ends of the primary winding 316*a* of the second transformer 316. In addition, a rectangular voltage having an amplitude value of 2(Vin/4)·(Ns/Np) [V] is applied across both ends of the second secondary winding 316*c* of the second transformer 316.

<Time Division t7 to t8>

The fifth switching device 309 and the fourth switching device 315 are turned OFF at time t7 by the gate drive signals indicated in the part (d) and the part (g) of FIG. 2. Hence, the voltage across both ends of the primary winding 316*a* of the second transformer 316 becomes 0 [V]. Since the eighth switching device 318 has been turned OFF at this time, the voltage across both ends of the second secondary winding 316*c* of the second transformer 316 becomes 0 [V].

The first and second half-bridge converters 350 and 360 in the switching power supply in accordance with Embodiment 1 operate as described above. In the case when the characteristics of the components constituting the first and second half-bridge converters 350 and 360 have variations or when the switching power supply is in a transient state at the start time of power supply operation, an imbalance occurs between the input voltages supplied to the half-bridge converters 350 and 360 respectively connected to the capacitors 302 and 303 for dividing the input voltage of the power supply. In the conventional switching power supply, the actual values of the input voltages to the half-bridge converters 350 and 360 are detected, whereby the imbalance between the output voltages is prevented. In Embodiment 1 in accordance with the present invention, the voltages applied to the transformers 306 and 316 are detected indirectly, and voltages proportional to the input voltages supplied to the half-bridge converters 350 and 360 are detected, whereby the imbalance between the output voltages is corrected.

Next, a method of correcting the imbalance between the input voltages supplied to the half-bridge converters 350 and 360 in the switching power supply in accordance with Embodiment 1 will be described.

In the switching power supply in accordance with Embodiment 1, the first transformer 308 is provided with the auxiliary winding 308*d* in addition to the primary winding 308*a*, the first secondary winding 308*b* and the second secondary winding 308*c*. The voltage applied to this auxiliary winding 308*d* is configured so as to be detected by the first voltage detection circuit 325. Similarly, the second transformer 316 is provided with the auxiliary winding 316*d* in addition to the primary winding 316*a*, the first secondary winding 316*b* and the second secondary winding 316*c*. The voltage applied to this auxiliary winding 316*d* is configured so as to be detected by the second voltage detection circuit 326. In other words, when it is assumed that the number of turns of each of the auxiliary windings 308*d* and 316*d* is Nb, a voltage of 2(Vin/4)·(Ns/Np) [V] is generated at each of the auxiliary windings 308*d* and 316*d* when the first switching device 306 or the third switching device 314 is in the ON state. The voltages generated across the auxiliary windings 308*d* and 316*d*, that is, the values detected by the first and second voltage detection circuits 325 and 326, have amplitude values proportional to the input voltages of the first and second half-bridge converters 350 and 360. The deviation between the output voltage of the first voltage detection circuit 325 and the output voltage of the second voltage detection circuit 326 is detected by the voltage deviation detection circuit 327. Furthermore, the deviation signal indicating the deviation detection value detected by this voltage deviation detection circuit 327 is input to the control circuit 324 via the voltage signal correction circuit 328 so that the drive signals for turning ON/OFF the switching devices are corrected. The control circuit 324 corrects the drive signals for the switching devices, thereby carrying out control so that the input deviation in the voltage deviation detection circuit 327 becomes zero.

As described above, in the switching power supply in accordance with Embodiment 1, even when the characteristics of the components constituting the first and second half-bridge converters 350 and 360 have variations or even when the switching power supply is in a transient state at the start time of power supply operation, the voltages applied to the transformers 308 and 316 are detected indirectly, whereby the output voltages from the half-bridge converters 350 and 360 are balanced. Hence, in the switching power supply in accordance with Embodiment 1, even in the case when an imbalance occurs in the half-bridge converters 350 and 360 respectively connected to the capacitors 302 and 303 for dividing the input voltage and a deviation occurs between the divided voltages, the input voltages supplied to the half-bridge converters 350 and 360 can be balanced securely.

Next, the configuration of the first and second voltage detection circuits 325 and 326 in the switching power supply in accordance with Embodiment 1 will be described below.

As an example of the first and second voltage detection circuits 325 and 326, a configuration is available wherein the current from each of the auxiliary windings 308*d* and 316*d* is rectified by using a full-wave rectifier and a DC voltage is detected. In the switching power supply in accordance with Embodiment 1 having the first and second voltage detection circuits 325 and 326 configured as described above, if the input DC voltage is equally divided by the capacitors 302 and 303, the voltages detected by the first and second voltage detection circuits 325 and 326 become equal to each other. Hence, the voltage deviation detection circuit 327 does not detect any deviation detection value and does not output any deviation signal to the control circuit 324.

If the input DC voltage cannot be divided equally by the capacitors 302 and 303, a deviation occurs between the voltages detected by the first and second voltage detection circuits 325 and 326. Hence, the voltage deviation detection circuit 327 detects a deviation detection value and outputs a deviation signal indicating this deviation detection value to the control circuit 324 via the voltage signal correction circuit 328.

In addition, as another example of the first and second voltage detection circuits 325 and 326, a configuration is available wherein means for detecting the peak value of a rectangular voltage is used. In the case when the first and second voltage detection circuits 325 and 326 are configured as described above, it is necessary to prevent malfunctions due to noise. For this purpose, a snubber circuit is appropriately inserted across both ends of each of the primary windings 308a and 316a or both ends of each of the auxiliary windings 308d and 316d of the transformers 308 and 316 to stabilize operation. Even in the switching power supply having the first and second voltage detection circuits 325 and 326 configured as described above, if the input DC voltage is equally divided by the capacitors 302 and 303 just as in the case of the above-mentioned configuration, the voltages detected by the first and second voltage detection circuits 325 and 326 become equal to each other. On the other hand, in the case when the input DC voltage cannot be equally divided by the capacitors 302 and 303, a deviation occurs between the voltages detected by the first and second voltage detection circuits 325 and 326. Hence, the voltage deviation detection circuit 327 detects a deviation detection value and outputs a deviation signal indicating this deviation detection value to the control circuit 324 via the voltage signal correction circuit 328.

The control circuit 324 is provided with a reference triangular signal generating circuit 501 that generates a triangular signal for determining the cycle of the drive signal for each switching device. In addition, the control circuit 324 is provided with drive signal generating means that receives the correction signal indicating the deviation value from the voltage deviation detection circuit 327 and generates the drive signals for ON/OFF operating the switching devices.

As described above, in the switching power supply in accordance with Embodiment 1, the output voltage detected by the output voltage detection circuit 351 is input to the output voltage error amplifier 322 and compared with the reference voltage of the output voltage setting reference power supply 323 by this output voltage error amplifier 322. An error signal indicating the output voltage error detection voltage obtained as the result of this comparison is amplified and input to the control circuit 324.

In a method for generating the drive signals for ON/OFF operating the switching devices in the control circuit 324, the triangular voltage from the reference triangular signal generating circuit 501 is compared with the output voltage error detection voltage from the output voltage error amplifier 322 by a comparator serving as voltage comparing means, and a pulse waveform signal is generated. At this time, the deviation voltage of the correction signal input from the voltage deviation detection circuit 327 via the voltage signal correction circuit 328 is added to or subtracted from the triangular voltage. The obtained value is compared with the output voltage error detection voltage from the output voltage error amplifier 322.

Figure 3:
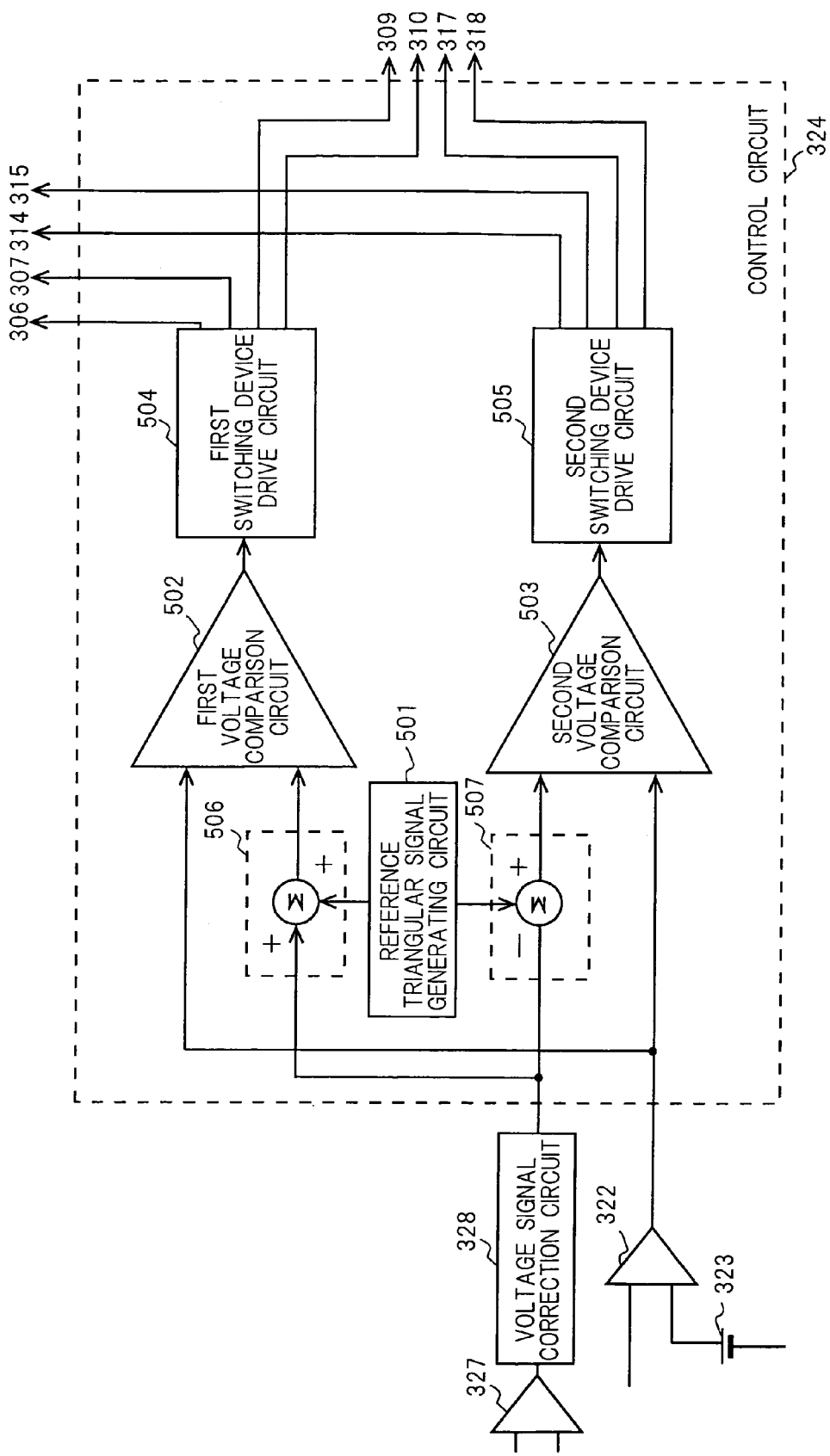
FIG. 3 is a block diagram showing the configuration of a control circuit in the switching power supply in accordance with Embodiment 1.

FIG. 3 is a block diagram showing the configuration of the drive signal generating means in the control circuit 324. As shown in FIG. 3, the deviation voltage of the correction signal input from the voltage deviation detection circuit 327 via the voltage signal correction circuit 328 is compared with the output voltage error detection voltage from the output voltage error amplifier 322.

In the control circuit 324, the deviation signal from the voltage signal correction circuit 328 is added to the triangular voltage by an adder 506 and input to a first voltage comparison circuit 502. The output voltage error detection voltage from the output voltage error amplifier 322 is also input to this first voltage comparison circuit 502 and compared with the value obtained by the addition. The result of the comparison is input to a first switching device drive circuit 504, whereby the first switching device 306, the second switching device 307, the fifth switching device 309 and the sixth switching device 310 of the first half-bridge converter 350 are drive-controlled. In addition, the correction signal from the voltage signal correction circuit 328 from which the triangular voltage is subtracted by an adder 507 is input to a second voltage comparison circuit 503. The output voltage error detection voltage from the output voltage error amplifier 322 is input to this second voltage comparison circuit 503 and compared with the value obtained by the subtraction. The result of the comparison is input to a second switching device drive circuit 505, whereby the third switching device 314, the fourth switching device 315, the seventh switching device 317 and the eighth switching device 318 of the second half-bridge converter 360 are drive-controlled.

For example, when the first voltage comparison circuit 502 of the control circuit 324 detects that the input voltage of the first half-bridge converter 350 is higher than its setting value on the basis of the correction signal of the voltage signal correction circuit 328, the first switching device drive circuit 504 changes the duty ratios of the drive signals for the switching devices 306, 307, 309 and 310 of the first half-bridge converter 350. Furthermore, the duty ratios of the drive signals for the switching devices 314, 315, 317 and 318 of the second half-bridge converter 360 are also changed. In other words, control is carried out to widen the pulse widths of the drive signals for the first and second switching devices 306 and 307 on the primary side of the first half-bridge converter 350, and to narrow the pulse widths of the drive signals for the third and fourth switching devices 314 and 315 on the primary side of the second half-bridge converter 360. By this control, the input voltage of the first half-bridge converter 350 is adjusted so as to become the setting value.

On the other hand, when the second voltage comparison circuit 503 of the control circuit 324 detects that the input voltage of the second half-bridge converter 360 is higher than its setting value on the basis of the correction signal of the voltage signal correction circuit 328, the second switching device drive circuit 505 carries out control to widen the pulse widths of the drive signals for the third and fourth switching devices 314 and 315 on the primary side of the second half-bridge converter 360. At the same time, the first switching device drive circuit 504 also carries out control to narrow the pulse widths of the drive signals for the first and second switching devices 306 and 307 on the primary side of the first half-bridge converter 350. By this control, the input voltage of the second half-bridge converter 360 is adjusted so as to become the setting value.

Since the switching power supply in accordance with Embodiment 1 is configured as described above, in the case when variations occur in the voltages divided by the capacitors 302 and 303, the drive signals can be controlled easily so that the switching devices are ON/OFF operated as desired. Furthermore, the imbalance due to the variations in the characteristics of the components can also be handled flexibly. As a result, the switching power supply in accordance with Embodiment 1 can provide highly reliable DC-DC converters.

In the switching power supply in accordance with Embodiment 1 of the present invention, the voltages applied to the switching devices are decreased by the series connection on the input sides. In particular, in a power supply for supplying electric power to semiconductor devices, such as microprocessors, a relatively high bus voltage (for example, 48 V) for distributing electric power to various sections of an appliance is required to be converted into a highly stable low voltage (for example, 1 V). The switching power supply in accordance with the present invention is configured so as to be able to carry out this conversion. The switching power supply in accordance with the present invention can stably conform to such a high bus voltage by connecting the input circuits in series, thereby being effective particularly as a power supply for semiconductor devices.

In the above-mentioned Embodiment 1, a configuration wherein two half-bridge-type DC-DC converters are connected in series has been described. However, the present invention is not limited to this configuration. It is obvious that the present invention can be applied to a configuration including a forward-type converter using one transistor, a flyback-type DC-DC converter, a full-bridge-type DC-DC converter or an irregular forward-type DC-DC converter in which switching transistors are connected to both ends of a switching transformer. Even if the circuit arrangement is different as described above, the switching power supply in accordance with the present invention can be applied to a configuration including means for detecting the voltages induced in the primary windings of isolating transformers, means for comparing the detection voltages obtained from DC-DC converters and means for controlling the ON/OFF periods of the drive signals for driving switching devices. It is obvious that the switching power supply having this kind of configuration is included in the scope of the present invention.

EMBODIMENT 2

Figure 4:
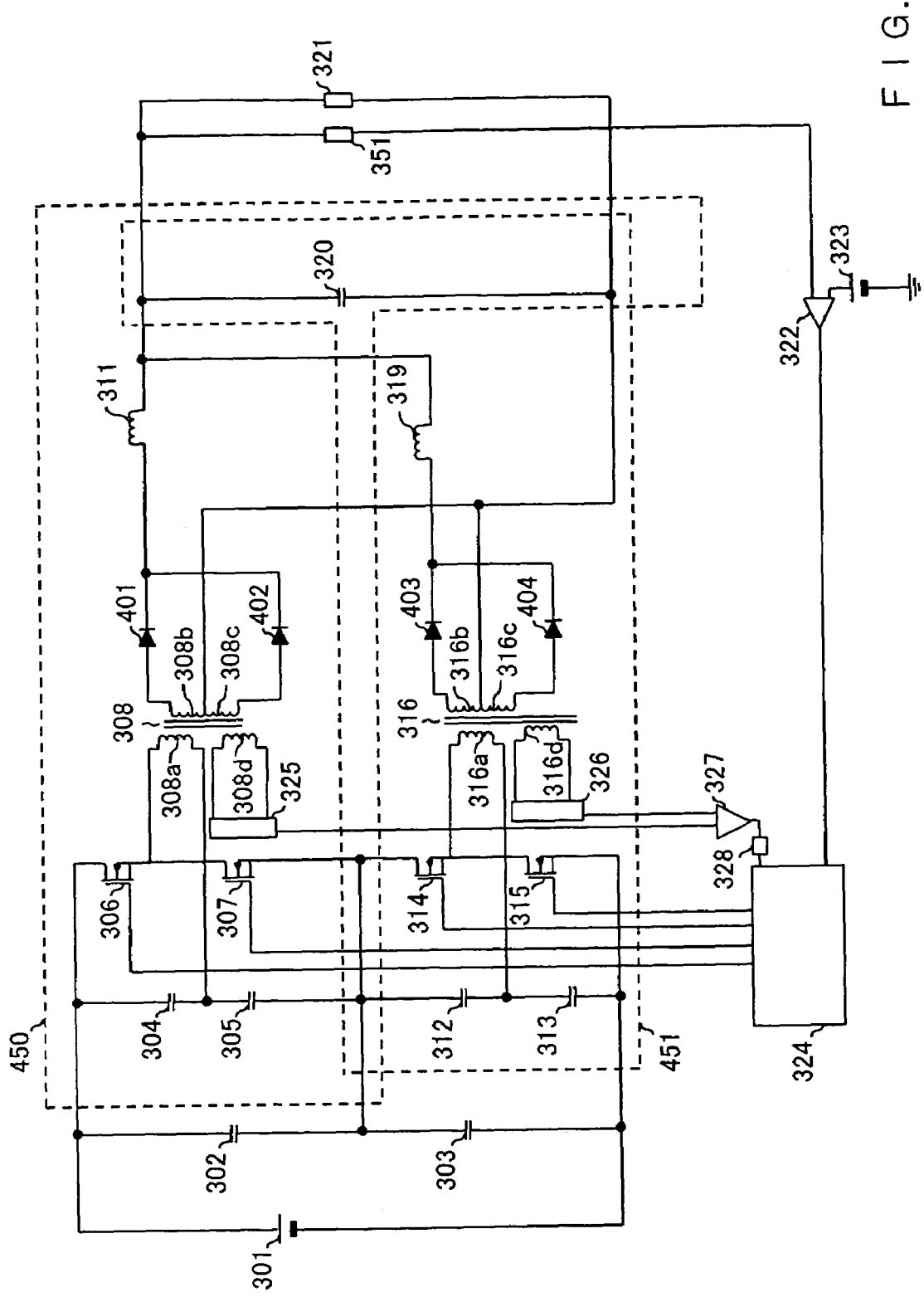
FIG. 4 is a circuit diagram showing the configuration of a switching power supply in accordance with Embodiment 2 of the present invention.

Next, a switching power supply in accordance with Embodiment 2 of the present invention will be described. FIG. 4 is a circuit diagram showing the configuration of the switching power supply in accordance with Embodiment 2 of the present invention. In Embodiment 2, the components having the same functions, configurations and operations as those of the switching power supply in accordance with the above-mentioned Embodiment 1 are designated by the same names and numerals, and their explanations are omitted.

In the switching power supply in accordance with Embodiment 2, just as in the case of the above-mentioned Embodiment 1, the input sides of two half-bridge-type DC-DC converters (hereafter simply referred to as half-bridge converters) 450 and 451 are connected in series, and the output sides thereof are connected in parallel. In other words, in the switching power supply in accordance with Embodiment 2, two capacitors 302 and 303 are connected in series to divide the voltage of a DC power supply 301, and the divided voltages are applied to the first half-bridge converter 450 and the second half-bridge converter 451.

In the first half-bridge converter 450, the series circuit of two capacitors 304 and 305 is connected in parallel with the capacitor 302. In addition, the series circuit of first and second switching devices 306 and 307 are connected in parallel with the series circuit of the capacitors 304 and 305. MOSFETs are herein taken as examples of the first and second switching devices 306 and 307. A primary winding 308a of a first transformer 308 is connected between the connection point of the two capacitors 304 and 305 and the connection point of the first and second switching devices 306 and 307. The first transformer 308 has the primary winding 308a, a first secondary winding 308b, a second secondary winding 308c and an auxiliary winding 308d. The first secondary winding 308b and the second secondary winding 308c of the first transformer 308 are respectively connected to first and second rectifier diodes 401 and 402 serving as rectifier means. One end of an output choke coil 311 is connected to the connection point of the first rectifier diode 401 and the second rectifier diode 402, and the other end of the output choke coil 311 is connected to a smoothing capacitor 320. Both ends of the smoothing capacitor 320 are output terminals, and a load 321 is connected across the terminals. The output voltage supplied to the load 321 is detected by an output voltage detection circuit 351 serving as output voltage detecting means and output to an output voltage error amplifier 322. The output voltage error amplifier 322 compares the output voltage with the reference voltage from an output voltage setting reference power supply 323, amplifies the error signal therebetween and outputs the error signal to a control circuit 324 serving as control means.

In the second half-bridge converter 451, the series circuit of two capacitors 312 and 313 is connected in parallel with the capacitor 303. In addition, the series circuit of third and fourth switching devices 314 and 315 is connected in parallel with the series circuit of the capacitors 312 and 313. MOSFETs are herein taken as examples of the third and fourth switching devices 314 and 315. A primary winding 316a of a second transformer 316 is connected between the connection point of the two capacitors 312 and 313 and the connection point of the third and fourth switching devices 314 and 315. The second transformer 316 has the primary winding 316a, a first secondary winding 316b, a second secondary winding 316c and an auxiliary winding 316d. The first secondary winding 316b and the second secondary winding 316c of the second transformer 316 are respectively connected to third and fourth rectifier diodes 403 and 404 serving as rectifier means. One end of an output choke coil 319 is connected to the connection point of the third rectifier diode 403 and the fourth rectifier diode 404, and the other end of the output choke coil 319 is connected to the smoothing capacitor 320.

As described above, the smoothing capacitor 320 is shared in the first half-bridge converter 450 and the second half-bridge converter 451. In other words, the output terminals of the first half-bridge converter 450 and the second half-bridge converter 451 are connected in parallel, and DC power is supplied to the load 321.

The switching power supply in accordance with Embodiment 2 is provided with voltage detection circuits 325 and 326, a voltage deviation detection circuit 327 and a voltage signal correction circuit 328, just as in the case of the above-mentioned Embodiment 1.

Figure 5:
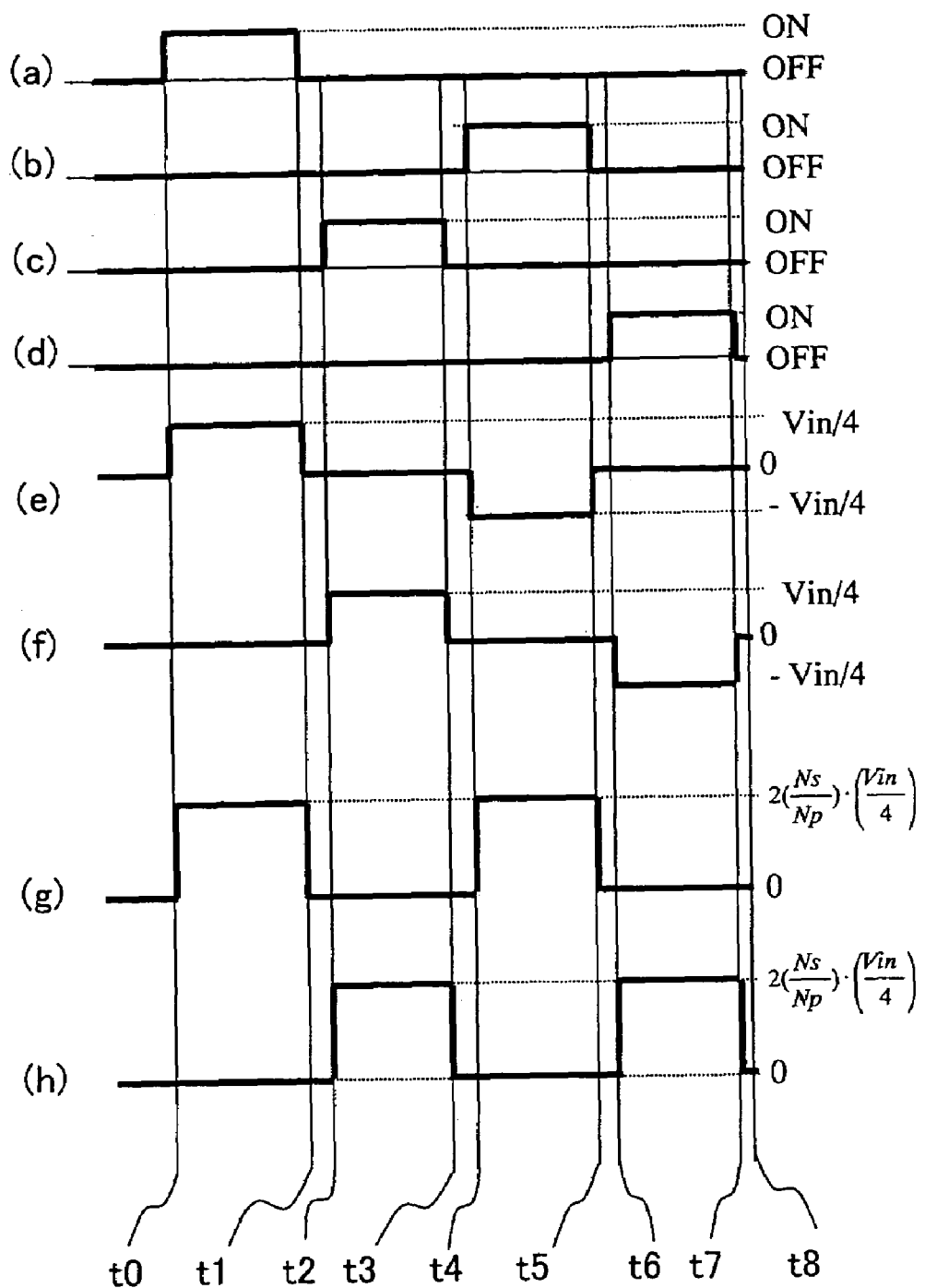
FIG. 5 is a diagram showing the waveforms of signals during the operation of the switching power supply in accordance with Embodiment 2.

FIG. 5 shows the waveforms of signals during the operation of the switching power supply in accordance with Embodiment 2. In FIG. 5, a part (a) indicates the drive signal for the first switching device 306, a part (b) indicates the drive signal for the second switching device 307, a part (c) indicates the drive signal for the third switching device 314, a part (d) indicates the drive signal for the fourth switching device 315, a part (e) indicates the waveform of the voltage applied to the primary winding 308a of the first transformer 308, and a part (f) indicates the waveform of the voltage applied to the primary winding 316a of the second transformer 316. In addition, in FIG. 5, a part (g) indicates the waveform of the voltage at the cathodes of the first and second rectifier diodes 401 and 402, and a part (h) indicates the waveform of the voltage at the cathodes of the third and fourth rectifier diodes 403 and 404.

The circuit operation during the period from time t0 to time t8 shown in FIG. 5 will be described below in time divisions.

<Time Division t0 to t1>

When the gate drive signal indicated in the part (a) of FIG. 5 is applied to the first switching device 306, the first switching device 306 is turned ON at time t0, and a voltage of (Vin/4) [V] is applied across both ends of the primary winding 308a of the first transformer 308. The voltage of (Vin/4) [V] is determined by the capacitors 304, 305, 312 and 313. At this time, the voltage across both ends of the primary winding 316a of the second transformer 316 is 0 [V]. When it is herein assumed that the number of turns of the primary winding 316a is Np and that the number of turns of each of the first and second secondary windings 308b and 308c is Ns, a voltage of (Vin/4)·(Ns/Np) [V] is generated between the cathodes of the first and second rectifier diodes 401 and 402 and the ground.

<Time Division t1 to t2>

When the gate drive signal indicated in the part (a) of FIG. 5 is applied to the first switching device 306 at time t1, the first switching device 306 is turned ON. Hence, the voltage across both ends of the primary winding 308a of the first transformer 308 drops to 0 [V]. In addition, the voltage at the cathodes of the first and second rectifier diodes 401 and 402 also drops to 0 [V].

<Time Division t2 to t3>

When the gate drive signal indicated in the part (c) of FIG. 5 is applied to the third switching device 314 at time t2, the third switching device 314 is turned ON. Hence, a voltage of (Vin/4) [V] is applied across both ends of the primary winding 316a of the second transformer 316. In addition, a rectangular voltage having an amplitude value of (Vin/4)·(Ns/Np) [V] is generated at the cathodes of the third and fourth rectifier diodes 403 and 404.

<Time Division t3 to t4>

When the gate drive signal indicated in the part (c) of FIG. 5 is applied to the third switching device 314 at time t3, the third switching device 314 is turned OFF. Hence, the voltage across both ends of the primary winding 316a of the second transformer 316 drops to 0 [V]. In addition, since the third switching device 314 is turned OFF by the gate drive signal indicated in the part (c) of FIG. 5, the voltage at the cathodes of the third and fourth rectifier diodes 403 and 404 drops to 0 [V].

<Time Division t4 to t5>

When the gate drive signal indicated in the part (b) of FIG. 5 is applied to the second switching device 307 at time t4, the second switching device 307 is turned ON. Hence, the voltage across both ends of the primary winding 308a of the first transformer 308 becomes −(Vin/4) [V]. At this time, a voltage of (Vin/4)·(Ns/Np) [V] is generated at the cathodes of the first and second rectifier diodes 401 and 402.

<Time Division t5 to t6>

When the gate drive signal indicated in the part (b) of FIG. 5 is applied to the second switching device 307 at time t5, the second switching device 307 is turned OFF. Hence, a voltage having an amplitude value of −(Vin/4) [V] is induced in the primary winding 308a of the first transformer 308. In addition, since the second switching device 307 is turned OFF, the voltage at the cathodes of the first and second rectifier diodes 401 and 402 becomes 0 [V].

<Time Division t6 to t7>

When the gate drive signal indicated in the part (d) of FIG. 5 is applied to the fourth switching device 315 at time t6, the fourth switching device 315 is turned ON. Hence, the voltage across both ends of the primary winding 316a of the second transformer 316 becomes 0 [V]. In addition, a rectangular voltage having an amplitude value of (Vin/4)·(Ns/Np) [V] is generated at the cathodes of the third and fourth rectifier diodes 403 and 404.

<Time Division t7 to t8>

When the gate drive signal indicated in the part (d) of FIG. 5 is applied to the fourth switching device 315 at time t7, the fourth switching device 315 is turned OFF. Hence, the voltage across both ends of the secondary winding 316a of the second transformer 316 becomes 0 [V]. In addition, since the fourth switching device 315 is turned OFF, the voltage at the cathodes of the third and fourth rectifier diodes 403 and 404 drops to 0 [V].

In Embodiment 2, the method of detecting the voltages induced in the auxiliary windings 308d and 316d, a method of comparing the detected voltages and of capturing its deviation into the control circuit 324 for generating the drive signals for the switching devices, and the like are the same as those in accordance with the above-mentioned Embodiment 1, and their explanations are omitted.

In particular, in Embodiment 2, the number of the switching devices to be controlled is fewer, whereby the control circuit can be configured simply. Furthermore, in accordance with the configuration of Embodiment 2, it is possible to provide a switching power supply capable of carrying out stable operation.

In the above-mentioned Embodiment 2, the configuration wherein two half-bridge-type DC-DC converters are connected in series has been described. However, the present invention is not limited to this configuration. It is obvious that the present invention can be applied to a configuration including a forward-type converter using one transistor, a flyback-type DC-DC converter, a full-bridge-type DC-DC converter or an irregular forward-type DC-DC converter in which switching transistors are connected to both ends of a switching transformer. Even if the circuit arrangement is different as described above, the switching power supply in accordance with the present invention can be applied to a configuration including means for detecting the voltages induced in the primary windings of isolating transformers, means for comparing the detection voltages obtained from DC-DC converters and means for controlling the ON/OFF periods of the drive signals for driving switching devices. It is obvious that the switching power supply having this kind of configuration is included in the scope of the present invention.

EMBODIMENT 3

Figure 6:
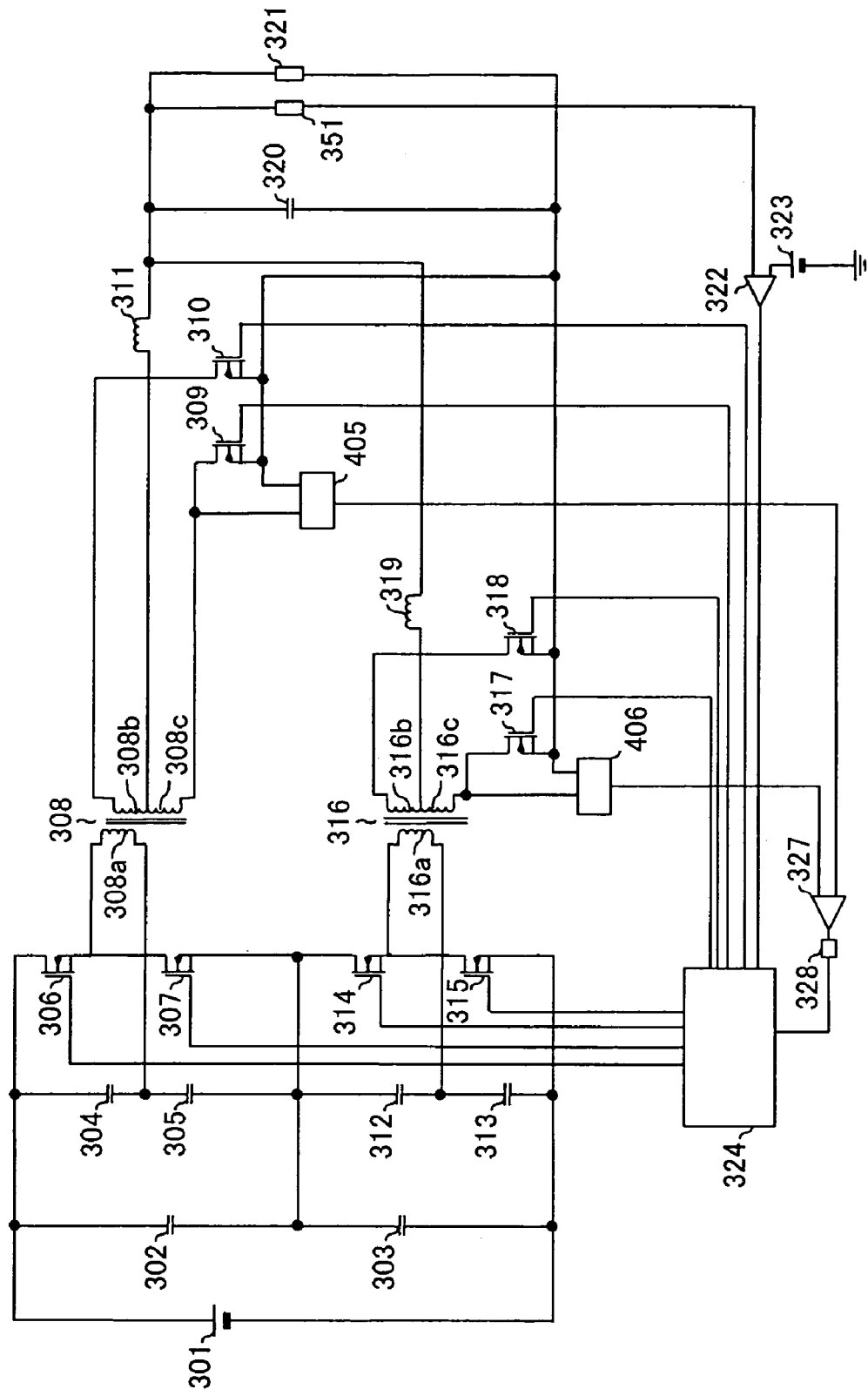
FIG. 6 is a circuit diagram showing the configuration of a switching power supply in accordance with Embodiment 3 of the present invention.

Next, a switching power supply in accordance with Embodiment 3 of the present invention will be described. FIG. 6 is a circuit diagram showing the configuration of the switching power supply in accordance with Embodiment 3 of the present invention. In Embodiment 3, the components having the same functions, configurations and operations as those of the switching power supply in accordance with the above-mentioned Embodiment 1 are designated by the same names and numerals, and their explanations are omitted.

In the switching power supply in accordance with Embodiment 3, just as in the case of the above-mentioned Embodiment 1, the input sides of two half-bridge-type DC-DC converters (hereafter simply referred to as half-bridge converters) are connected in series, and the output sides thereof are connected in parallel. In other words, in the switching power supply in accordance with Embodiment 3, two capacitors 302 and 303 are connected in series to divide the voltage of a DC power supply 301, and the divided voltages are applied to the first half-bridge converter and the second half-bridge converter.

As shown in FIG. 6, the switching power supply in accordance with Embodiment 3 is provided with a first voltage detection circuit 405 and a second voltage detection circuit 406. The first voltage detection circuit 405 detects the voltage applied across both terminals of a fifth switching device 309 connected in series with a second secondary winding 308c of a first transformer 308. The second voltage detection circuit 406 detects the voltage applied across both terminals of a seventh switching device 317 connected in series with a second secondary winding 316c of a second transformer 316. The configuration, except for these voltage detection circuits 405 and 406, is the same as the configuration of the switching power supply in accordance with Embodiment 1 shown in FIG. 1.

The value detected by the first voltage detection circuit 405 has an amplitude value proportional to the input voltage of the first half-bridge converter, and the value detected by the second voltage detection circuit 406 has an amplitude value proportional to the input voltage of the second half-bridge converter. The output voltages of the first and second voltage detection circuits 405 and 406 are input to a voltage deviation detection circuit 327. The voltage deviation detection circuit 327 detects the deviation between the voltages across both terminals of the output-side switching devices of the half-bridge converters. This deviation detection value is input to a control circuit 324. The control circuit 324 corrects drive signals for ON/OFF operating the switching devices by using a deviation signal indicating the input deviation detection value. The control circuit 324 corrects the drive signals for the switching devices as described above, thereby carrying out control so that the deviation detection value detected by the voltage deviation detection circuit 405, 406 becomes zero.

As described above, in the switching power supply in accordance with Embodiment 3, the voltage of a DC power supply 301 is divided into halves by the capacitors 302 and 303. These divided voltages are applied to the capacitors 302 and 303. However, in the case when the characteristics of the components constituting the half-bridge converters connected in parallel with the capacitors 302 and 303 have variations or when the switching power supply is in a transient state at the start time of power supply operation, a deviation occurs between the voltages divided by the capacitors 302 and 303. In the conventional switching power supply, the actual values of the input voltages are detected, whereby the output voltages are prevented from being unbalanced, as described above. However, in the switching power supply in accordance with Embodiment 3 of the present invention, the voltages applied to the transformers 308 and 316 are detected indirectly, whereby the imbalance state between the half-bridge converters is detected. Since the switching power supply in accordance with Embodiment 3 is configured as described above, the switching power supply can flexibly handle the imbalance between the input voltages of the half-bridge converters and the imbalance between load currents associated therewith.

In the above-mentioned Embodiment 3, the configuration wherein two half-bridge-type DC-DC converters are connected in series has been described. However, the present invention is not limited to this configuration. It is obvious that the present invention can be applied to a configuration including a forward-type converter using one transistor, a flyback-type DC-DC converter, a full-bridge-type DC-DC converter or an irregular forward-type DC-DC converter in which switching transistors are connected to both terminals of a switching transformer. Even if the circuit arrangement is different as described above, the switching power supply in accordance with the present invention can be applied to a configuration including means for detecting the voltages induced in the primary windings of isolating transformers, means for comparing the detection voltages obtained from DC-DC converters and means for controlling the ON/OFF periods of the drive signals for driving switching devices. It is obvious that the switching power supply having this kind of configuration is included in the scope of the present invention.

EMBODIMENT 4

Next, a switching power supply in accordance with Embodiment 4 of the present invention will be described. FIG. 7 is a circuit diagram showing the configuration of the switching power supply in accordance with Embodiment 4 of the present invention. In Embodiment 4, the components having the same functions, configurations and operations as those of the switching power supply in accordance with the above-mentioned Embodiment 1 are designated by the same names and numerals, and their explanations are omitted.

In the switching power supply in accordance with Embodiment 4, just as in the case of the above-mentioned Embodiment 1, the input sides of two half-bridge-type DC-DC converters (hereafter simply referred to as half-bridge converters) are connected in series, and the output sides thereof are connected in parallel. In other words, in the switching power supply in accordance with Embodiment 4, two capacitors 302 and 303 are connected in series to divide the voltage of a DC power supply 301, and the divided voltages are applied to the first half-bridge converter and the second half-bridge converter.

As shown in FIG. 7, the switching power supply in accordance with Embodiment 4 is provided with a first voltage detection circuit 407 for detecting the voltage at the connection point of a first secondary winding 308b and a second secondary winding 308c of a first transformer 308 and a second-voltage detection circuit 408 for detecting the voltage at the connection point of a first secondary winding 316b and a second secondary winding 316c of a second transformer 316. In the switching power supply in accordance with Embodiment 4, the configuration, except for these voltage detection circuits 407 and 408, is the same as the configuration of the switching power supply in accordance with Embodiment 1 shown in FIG. 1.

The value detected by the first voltage detection circuit 407 has an amplitude value proportional to the input voltage of the first half-bridge converter, and the value detected by the second voltage detection circuit 408 has an amplitude value proportional to the input voltage of the second half-bridge converter. The output voltages of the first and second voltage detection circuits 407 and 408 are input to a voltage deviation detection circuit 327. The voltage deviation detection circuit 327 detects the deviation between the output power. This deviation detection value is input to a control circuit 324. The control circuit 324 corrects drive signals for ON/OFF operating switching devices by using a deviation signal indicating the input deviation detection value. The control circuit 324 corrects the drive signals for the switching devices as described above, thereby carrying out control so that the deviation detection value detected by the voltage deviation detection circuit 407, 408 becomes zero.

As described above, in the switching power supply in accordance with Embodiment 4, the voltage of a DC power supply 301 is divided into halves by the capacitors 302 and 303. These divided voltages are applied to the capacitors 302 and 303. However, in the case when the characteristics of the components constituting the half-bridge converters connected in parallel with the capacitors 302 and 303 have variations or when the switching power supply is in a transient state at the start time of power supply operation, a deviation occurs between the voltages divided by the capacitors 302 and 303. However, in the switching power supply in accordance with Embodiment 4, the voltages applied to the transformers 308 and 316 are detected indirectly, whereby the circuit states of the half-bridge converters are detected. Hence, the apparatus can flexibly handle the imbalance between the half-bridge converters.

In the above-mentioned Embodiment 4, the configuration wherein two half-bridge-type DC-DC converters are connected in series has been described. However, the present invention is not limited to this configuration. It is obvious that the present invention can be applied to a configuration including a forward-type converter using one transistor, a flyback-type DC-DC converter, a full-bridge-type DC-DC converter or an irregular forward-type DC-DC converter in which switching transistors are connected to both terminals of a switching transformer. Even if the circuit arrangement is different as described above, the switching power supply in accordance with the present invention can be applied to a configuration including means for detecting the voltages induced in the primary windings of isolating transformers, means for comparing the detection voltages obtained from DC-DC converters and means for controlling the ON/OFF periods of the drive signals for driving switching devices. It is obvious that the switching power supply having this kind of configuration is included in the scope of the present invention.

EMBODIMENT 5

Figure 8:
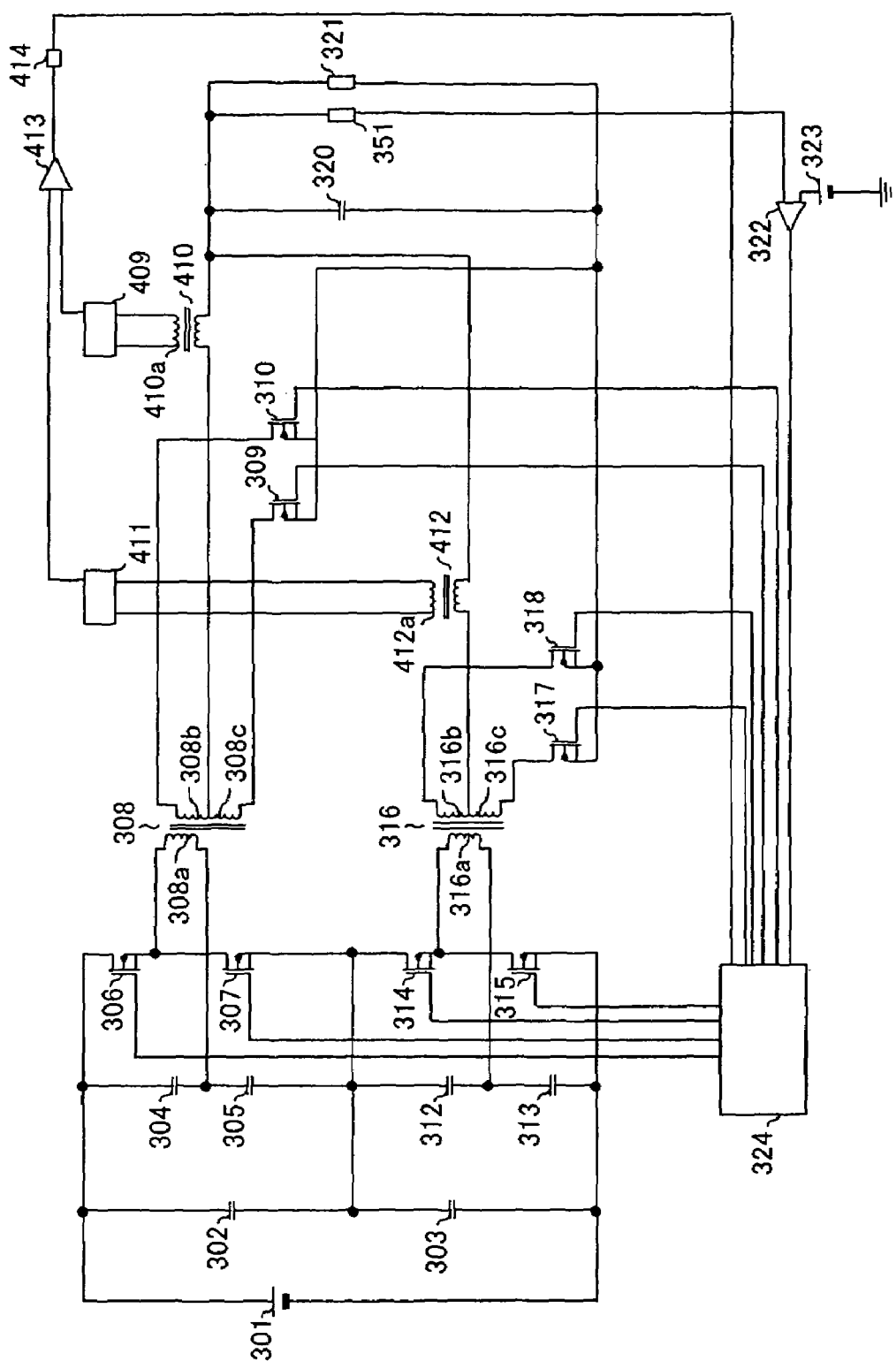
FIG. 8 is a circuit diagram showing the configuration of a switching power supply in accordance with Embodiment 5 of the present invention.

Next, a switching power supply in accordance with Embodiment 5 of the present invention will be described. FIG. 8 is a circuit diagram showing the configuration of the switching power supply in accordance with Embodiment 5 of the present invention. In Embodiment 5, the components having the same functions, configurations and operations as those of the switching power supply in accordance with the above-mentioned Embodiment 1 are designated by the same names and numerals, and their explanations are omitted.

In the switching power supply in accordance with Embodiment 5, just as in the case of the above-mentioned Embodiment 1, the input sides of two half-bridge-type DC-DC converters (hereafter simply referred to as half-bridge converters) are connected in series, and the output sides thereof are connected in parallel. In other words, in the switching power supply in accordance with Embodiment 5, two capacitors 302 and 303 are connected in series to divide the voltage of a DC power supply 301, and the divided voltages are applied to the first half-bridge converter and the second half-bridge converter.

As shown in FIG. 8, in the switching power supply in accordance with Embodiment 5, output choke coils 410 and 412 are provided with auxiliary windings 410a and 412a, respectively, and voltages induced in the auxiliary windings 410a and 412a are detected by voltage detection circuits 409 and 411, respectively. The switching power supply in accordance with Embodiment 5 differs from the switching power supply in accordance with the above-mentioned Embodiment 1 shown in FIG. 1 in that the output choke coils 410 and 412 are provided with the auxiliary windings 410a and 412a, respectively, and that the voltage detection circuits 409 and 411 are connected to the auxiliary windings 410a and 412a, respectively.

The value detected by the first voltage detection circuit 409 has a value proportional to the input voltage of the first half-bridge converter, and the value detected by the second voltage detection circuit 411 has a value proportional to the input voltage of the second half-bridge converter. The output voltages of the first and second voltage detection circuits 409 and 411 are input to a voltage deviation detection circuit 413. The voltage deviation detection circuit 413 detects the deviation between the voltages applied to the output choke coils 410 and 412. This deviation detection value is input to a control circuit 324 via a voltage signal correction circuit 414. The control circuit 324 corrects drive signals for ON/OFF operating switching devices by using a deviation signal indicating the input deviation detection value. The control circuit 324 corrects the drive signals for the switching devices as described above, thereby carrying out control so that the deviation detection value detected by the voltage deviation detection circuit 409, 411 becomes zero.

As described above, in the switching power supply in accordance with Embodiment 5, the voltage of a DC power supply 301 is divided into halves by the capacitors 302 and 303. These divided voltages are applied to the capacitors 302 and 303. However, in the case when the characteristics of the components constituting the half-bridge converters connected in parallel with the capacitors 302 and 303 have variations or when the switching power supply is in a transient state at the start time of power supply operation, a deviation occurs between the voltages divided by the capacitors 302 and 303. However, in the switching power supply in accordance with Embodiment 5, the voltages applied to the transformers 308 and 316 are detected indirectly, whereby the circuit states of the half-bridge converters are detected. Hence, the apparatus can flexibly handle the imbalance between the half-bridge converters.

In the above-mentioned Embodiment 5, the configuration wherein two half-bridge-type DC-DC converters are connected in series has been described. However, the present invention is not limited to this configuration. It is obvious that the present invention can be applied to a configuration including a forward-type converter using one transistor, a flyback-type DC-DC converter, a full-bridge-type DC-DC converter or an irregular forward-type DC-DC converter in which switching transistors are connected to both terminals of a switching transformer. Even if the circuit arrangement is different as described above, the switching power supply in accordance with the present invention can be applied to a configuration including means for detecting the voltages induced in the primary windings of isolating transformers, means for comparing the detection voltages obtained from DC-DC converters and means for controlling the ON/OFF periods of the drive signals for driving switching devices. It is obvious that the switching power supply having this kind of configuration is included in the scope of the present invention.

EMBODIMENT 6

Next, a switching power supply in accordance with Embodiment 6 of the present invention will be described.

Figure 9:
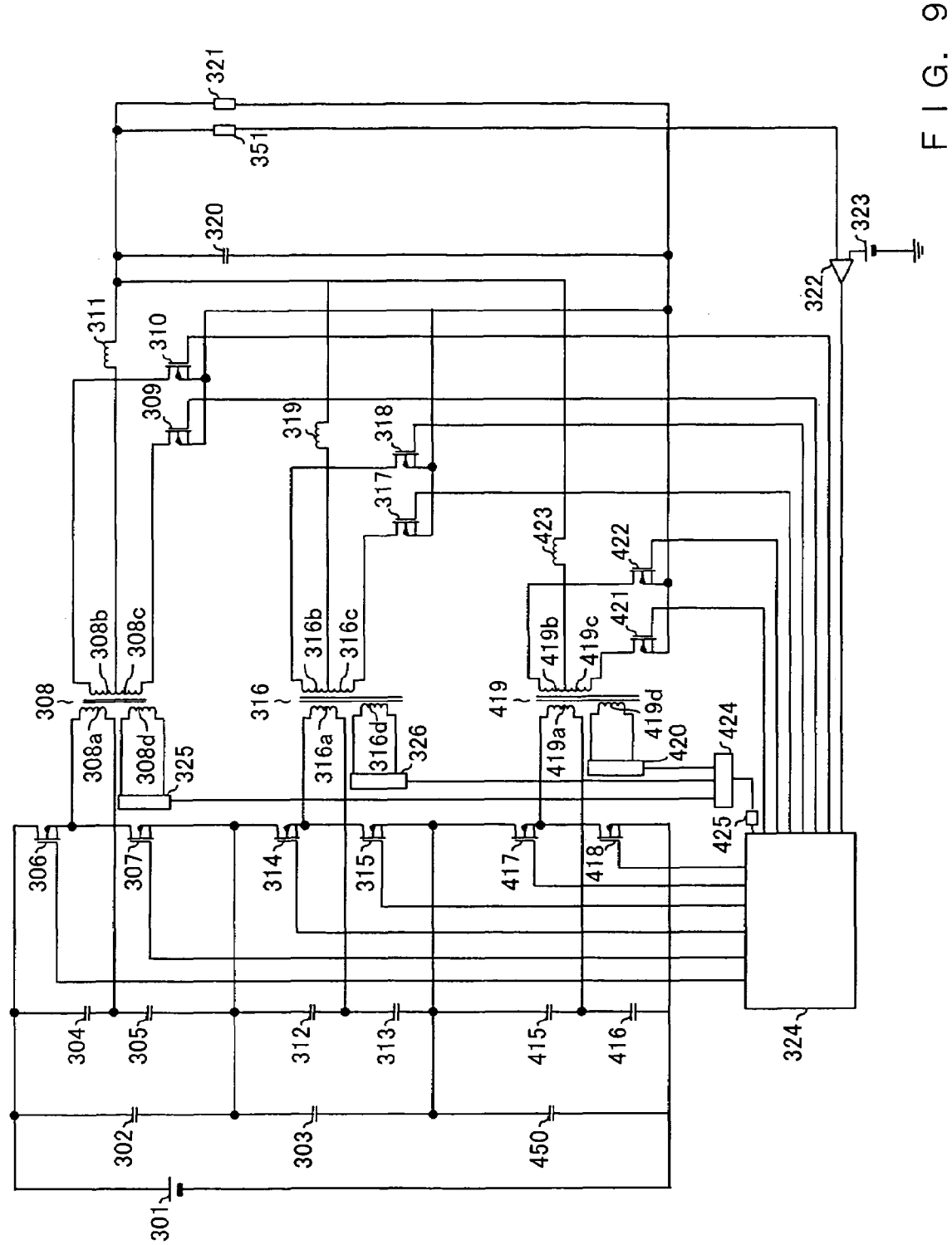
FIG. 9 is a circuit diagram showing the configuration of a switching power supply in accordance with Embodiment 6 of the present invention.

FIG. 9 is a circuit diagram showing the configuration of the switching power supply in accordance with Embodiment 6 of the present invention. In Embodiment 6, the components having the same functions, configurations and operations as those of the switching power supply in accordance with the above-mentioned Embodiment 1 are designated by the same names and numerals, and their explanations are omitted.

In the switching power supply in accordance with Embodiment 6, the input sides of three half-bridge-type DC-DC converters (hereafter simply referred to as half-bridge converters) are connected in series and the output sides thereof are connected in parallel. In other words, in the switching power supply in accordance with Embodiment 6, three capacitors 302, 303 and 450 are connected in series to divide the voltage of a DC power supply 301 into thirds, and the divided voltages are applied to the first half-bridge converter, the second half-bridge converter and the third half-bridge converter.

As shown in FIG. 9, in the switching power supply in accordance with Embodiment 6, the third half-bridge converter is added to the configuration of the switching power supply in accordance with the above-mentioned Embodiment 1 shown in FIG. 1. Hence, the switching power supply in accordance with Embodiment 6 is an apparatus obtained by adding the third half-bridge converter having the same configuration as that of the first half-bridge converter. The third half-bridge converter comprises capacitors 415 and 416, a ninth switching device 417, a tenth switching device 418, a third transformer 419, an 11th switching device 421, a 12th switching device 422, a smoothing choke coil 423 and a smoothing capacitor 320. Hence, the output terminals of the first half-bridge converter, the second half-bridge converter and the third half-bridge converter are connected in parallel, and DC power is supplied to a load 321.

In addition, to set the output voltage, an output voltage detection circuit 351 for detecting the output voltage, an output voltage setting reference power supply 323 and an output voltage error amplifier 322 for obtaining the deviation between the output voltage and the reference voltage of the reference power supply 323 are provided just as in the case of the above-mentioned Embodiment 1. An error signal indicating the deviation detection value from the output voltage error amplifier 322 is input to a control circuit 324, and the control circuit 324 generates drive signals for ON/OFF driving the switching devices.

In the switching power supply in accordance with Embodiment 6, the voltage generated across an auxiliary winding 308d of a first transformer 308 is detected by a voltage detection circuit 325, the voltage generated across an auxiliary winding 316d of a second transformer 316 is detected by a voltage detection circuit 326, and the voltage generated across an auxiliary winding 419d of the third transformer 419 is detected by a voltage detection circuit 420. The outputs of the voltage detection circuits 325, 326 and 420 are input to an average voltage detection circuit 424. The average voltage detection circuit 424 calculates the average voltage value of the voltage generated across the auxiliary winding 308d of the first transformer 308, the voltage generated across the auxiliary winding 316d of the second transformer 316 and the voltage generated across the auxiliary winding 419d of the third transformer 419. The average voltage value is compared with the detection voltages. The result of the comparison is output from the average voltage detection circuit 424 to the control circuit 324 via voltage signal correction means 425.

The amplified error signal from the output voltage error amplifier 322 and a deviation signal indicating the result of the comparison of the output voltage of the first transformer 308, the output voltage of the second transformer 316 and the output voltage of the third transformer 419 with the average voltage of these output voltages are input to the control circuit 324. On the basis of these signals, the switching devices 306, 307, 309, 310, 314, 315, 317, 318, 417, 418, 421 and 422 are ON/OFF controlled.

Figure 10:
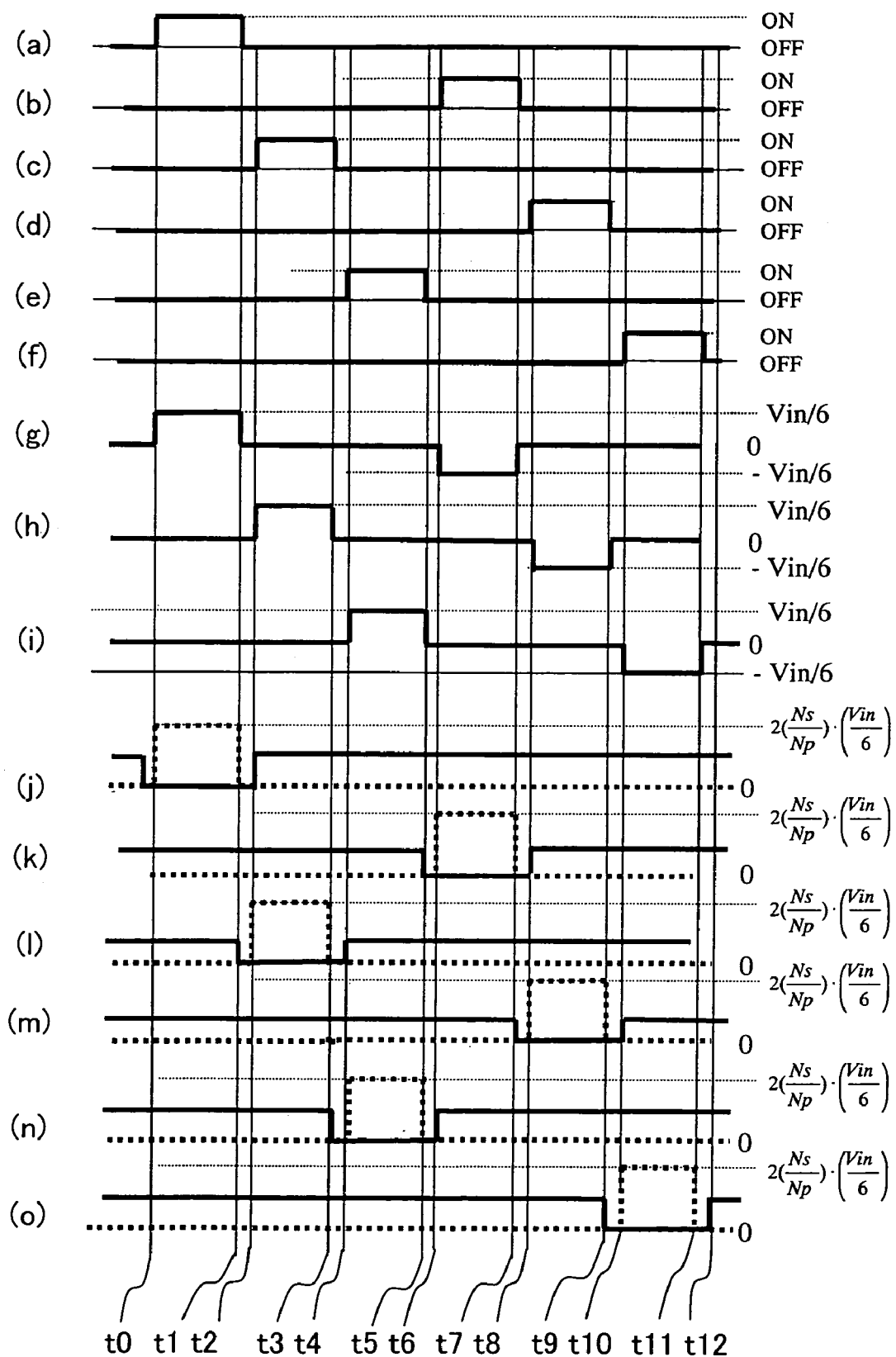
FIG. 10 is a diagram showing the waveforms of signals during the operation of the switching power supply in accordance with Embodiment 6 of the present invention.
Figure 11A:
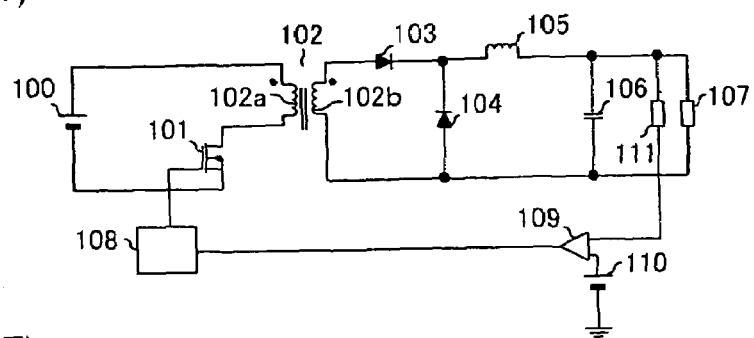
FIG. 11A is a circuit diagram showing the configuration of the conventional forward-type DC-DC converter.
Figure 11B:
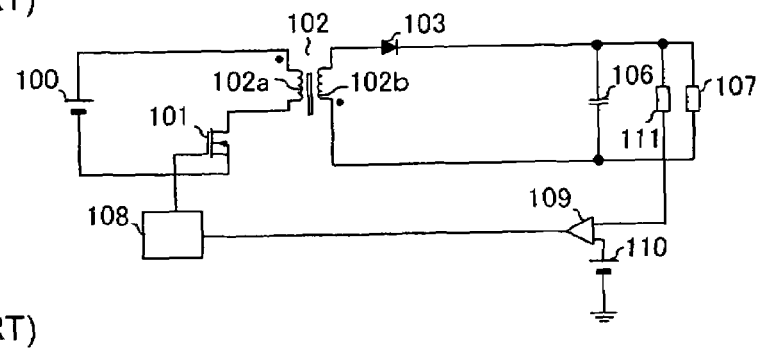
FIG. 11B is a circuit diagram showing the configuration of the conventional flyback-type DC-DC converter.
Figure 11C:
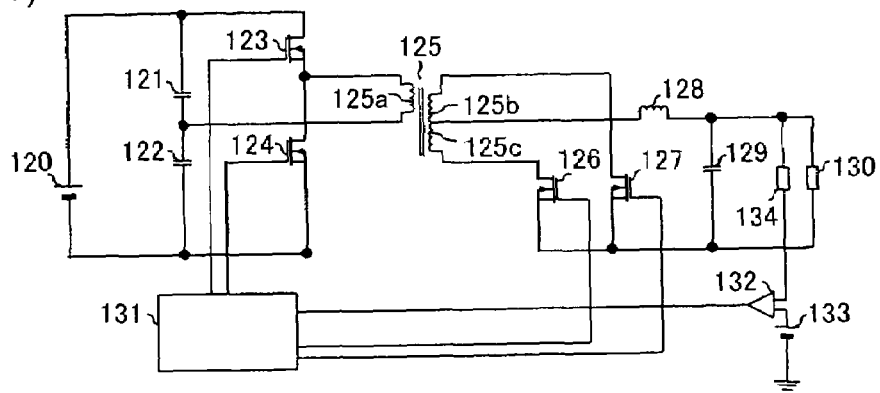
FIG. 11C is a circuit diagram showing the configuration of the conventional half-bridge-type DC-DC converter.
Figure 11D:
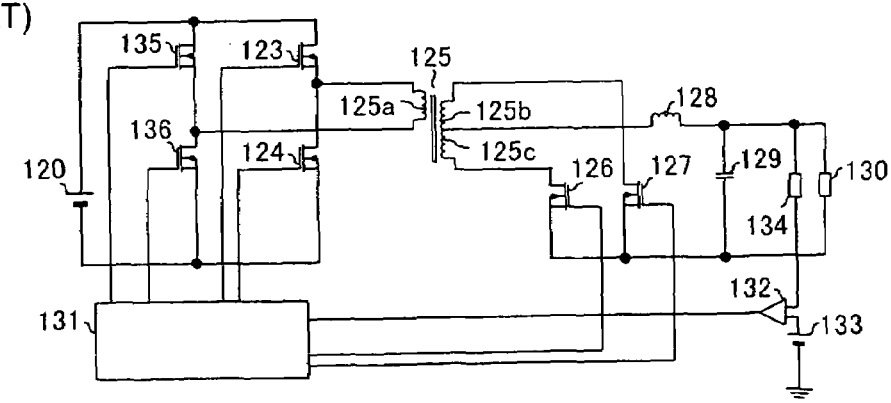
FIG. 11D is a circuit diagram showing the configuration of the conventional full-bridge-type DC-DC converter.
Figure 12A:
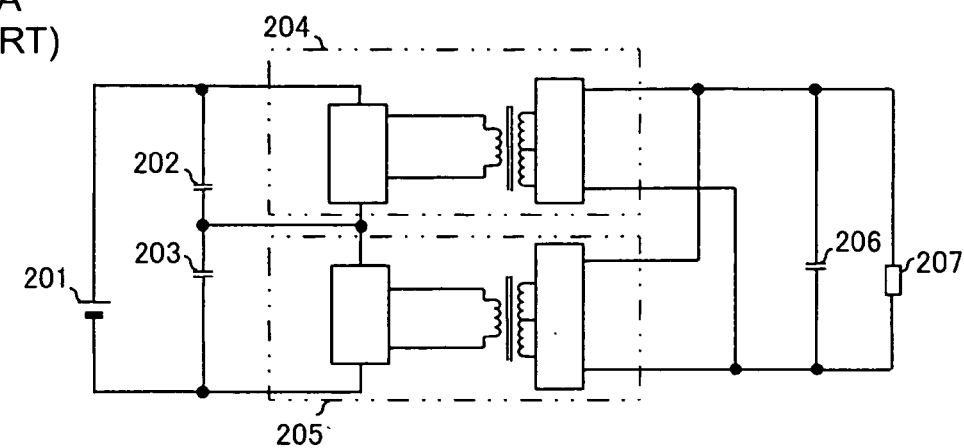
FIG. 12A is a circuit diagram illustrating a method of connecting DC-DC converters.
Figure 12B:
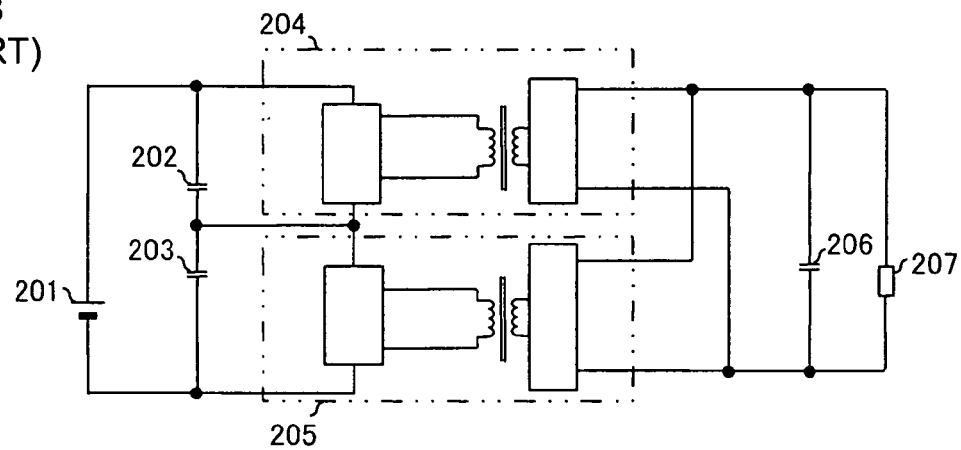
FIG. 12B is a circuit diagram illustrating another method of connecting DC-DC converters.

FIG. 10 shows the waveforms of signals during the operation of the switching power supply in accordance with Embodiment 6. In FIG. 10, a part (a) indicates the drive signal for the first switching device 306, a part (b) indicates the drive signal for the second switching device 307, a part (c) indicates the drive signal for the third switching device 314, a part (d) indicates the drive signal for the fourth switching device 315, a part (e) indicates the drive signal for the ninth switching device 417, a part (f) indicates the drive signal for the tenth switching device 418, a part (g) indicates the waveform of the voltage applied to the primary winding 308a of the first transformer 308, a part (h) indicates the waveform of the voltage applied to the primary winding 316a of the second transformer 316, and a part (i) indicates the waveform of the voltage applied to the primary winding 419a of the third transformer 419. In FIG. 10, the solid line in a part (j) indicates the drive signal for the fifth switching device 309, and the broken line indicates the waveform of the voltage applied across both terminals of the fifth switching device 309. The solid line in a part (k) of FIG. 10 indicates the drive signal for the sixth switching device 310, and the broken line indicates the waveform of the voltage applied across both terminals of the sixth switching device 310. The solid line in a part (l) of FIG. 10 indicates the drive signal for the seventh switching device 317, and the broken line indicates the waveform of the voltage applied across both terminals of the seventh switching device 317. The solid line in a part (m) of FIG. 10 indicates the drive signal for the eighth switching device 318, and the broken line indicates the waveform of the voltage applied across both terminals of the eighth switching device 318. The solid line in a part (n) of FIG. 10 indicates the drive signal for the 11th switching device 421, and the broken line indicates the waveform of the voltage applied across both terminals of the 11th switching device 421. The solid line in a part (o) of FIG. 10 indicates the drive signal for the 12th switching device 422, and the broken line indicates the waveform of the voltage applied across both terminals of the 12th switching device 422.

The circuit operation during the period from time t0 to time t12 shown in FIG. 10 will be described below in time divisions.

<Time Division t0 to t1>

When the gate drive signal indicated in the part (a) of FIG. 10 is applied to the first switching device 306, the first switching device 306 is turned ON at time t0. Hence, a voltage corresponding to (Vin/6) [V], a sixth of the input voltage Vin [V] of the DC power supply 301, indicated in the part (g) of FIG. 10 is applied across both ends of the primary winding 308a of the first transformer 308. The voltage of (Vin/6) [V] is determined by the capacitors 304, 305, 312, 313, 415 and 416. At this time, the fifth switching device 309 has already been turned OFF by the gate drive signal as indicated in the part (j) of FIG. 10. Hence, when it is assumed that the number of turns of the primary winding 308a of the first transformer 308 is Np and that the number of turns of the first secondary winding 308b is Ns, a rectangular voltage having an amplitude value of 2·(Vin/6) ·(Ns/Np) [V] is applied to the first secondary winding 308b of the first transformer 308.

<Time Division t1 to t2>

At time t1, the first switching device 306 is turned OFF by the gate drive signal indicated in the part (a) of FIG. 10. Hence, the voltage across both ends of the primary winding 308a of the first transformer 308 drops to 0 [V].

<Time Division t2 to t3>

At time t2, the third switching device 314 is turned ON by the gate drive signal indicated in the part (c) of FIG. 10. Hence, the voltage across both ends of the primary winding 316a of the second transformer 316 becomes (Vin/6) [V] as indicated in the part (h) of FIG. 10. In addition, at this time, a voltage of 2·(Vin/6)·(Ns/Np) [V] is applied across both ends of the first secondary winding 316b of the second transformer 316 by the gate drive signal indicated in the part (l) of FIG. 10.

<Time Division t3 to t4>

At time t3, the third switching device 314 is turned OFF by the gate drive signal indicated in the part (c) of FIG. 10. Hence, the voltage across both ends of the primary winding 316a of the second transformer 316 becomes 0 [V] as indicated in the part (h) of FIG. 10. In addition, the voltage across both ends of the first secondary winding 316b of the second transformer 316 becomes 0 [V].

<Time Division t4 to t5>

At time t4, the ninth switching device 417 is turned ON by the gate drive signal indicated in the part (e) of FIG. 10. Hence, the voltage across both ends of the primary winding 419a of the third transformer 419 becomes (Vin/6) [V]. Since the 11th switching device 421 has been turned OFF at this time by the gate drive signal indicated in the solid line in the part (n) of FIG. 10, the voltage across both terminals of the 11th switching device 421 becomes 2·(Vin/6)·(Ns/Np) [V].

<Time Division t5 to t6>

At time t5, the ninth switching device 417 is turned OFF by the gate drive signal indicated in the part (e) of FIG. 10. Hence, the voltage across both ends of the primary winding 419a of the third transformer 419 becomes 0 [V]. At this time, the voltage across both terminals of the 11th switching device 421 drops to 0 [V].

<Time Division t6 to t7>

At time t6, the second switching device 305 is turned ON by the gate drive signal indicated in the part (b) of FIG. 10. Hence, the voltage across both ends of the primary winding 308a of the first transformer 308 becomes −(Vin/6) [V]. Since the sixth switching device 310 has been turned OFF at this time by the gate drive signal indicated in the solid line in the part (k) of FIG. 10, a voltage of 2·(Vin/6)·(Ns/Np) [V] is applied across both terminals of the sixth switching device 310.

<Time Division t7 to t8>

At time t7, the second switching device 305 is turned OFF by the gate drive signal indicated in the part (b) of FIG. 10. Hence, the voltage across both ends of the primary winding 308a of the first transformer 308 becomes 0 [V]. At this time, the voltage across both terminals of the sixth switching device 310 has dropped to 0 [V] as indicated in the part (k) of FIG. 10.

<Time Division t8 to t9>

At time t8, the fourth switching device 315 is turned ON by the gate drive signal indicated in the part (d) of FIG. 10. Hence, the voltage across both ends of the primary winding 316a of the second transformer 316 becomes −(Vin/6) [V]. At this time, a voltage of 2·(Vin/6)·(Ns/Np) [V] is applied across both terminals of the eighth switching device 318 by the gate drive signal indicated in the part (m) of FIG. 10.

<Time Division t9 to t10>

At time t9, the fourth switching device 315 is turned OFF by the gate drive signal indicated in the part (d) of FIG. 10. Hence, the voltage across both ends of the primary winding 316a of the second transformer 316 becomes 0 [V]. At this time, the voltage across both terminals of the eighth switching device 318 also drops to 0 [V].

<Time Division t10 to t11>

At time t10, the 10th switching device 418 is turned ON by the gate drive signal indicated in the part (f) of FIG. 10. Hence, a voltage of −(Vin/6) [V] is applied across both ends of the primary winding 419a of the third transformer 419. At this time, a voltage of 2·(Vin/6)·(Ns/Np) [V] is applied across both terminals of the 12th switching device 422 by the gate drive signal indicated in the part (o) of FIG. 10.

<Time Division t11 to t12>

At time t11, the 10th switching device 418 is turned OFF by the gate drive signal indicated in the part (f) of FIG. 10. Hence, the voltage across both ends of the primary winding 419a of the third transformer 419 drops to 0 [V]. At this time, the voltage across both terminals of the 12th switching device 422 has also dropped to 0 [V] by the gate drive signal indicated in the part (o) of FIG. 10.

The above is the operation of the switching power supply in accordance with Embodiment 6 of the present invention.

In the switching power supply in accordance with Embodiment 6 of the present invention, the transformers 308, 316 and 419 are provided with the auxiliary windings 308d, 316d and 419d, respectively, in addition to the primary windings 308a, 316a and 419a, the first secondary windings 308b, 316b and 419b and the second secondary windings 308c, 316c and 419c. The switching power supply is further provided with the voltage detection circuits 325, 326 and 420 for detecting the voltages applied across both terminals of the auxiliary windings 308d, 316d and 419d. In other words, when it is assumed that the number of turns of each of the auxiliary windings 308d, 316d and 419d is Nb, a voltage of 2·(Vin/6)·(Nb/Np) [V] is generated across both terminals of the auxiliary windings 308d, 316d and 419d at the time when the first switching device 306 or the third switching device 314 is turned ON. The voltage signals generated across the auxiliary windings 308d, 316d and 419d have amplitude values proportional to the input voltages of the half-bridge converters. The average voltage of the output voltages of the voltage detection circuits 325, 326 and 420 provided for the half-bridge converters is calculated by the average voltage detection circuit 424. The average voltage detection circuit 424 then detects the deviation between the average voltage and the output voltages of the voltage detection circuits 325, 326 and 420. An error signal indicating the detected deviation value is input to the control circuit 324 via the voltage signal correction circuit 328. The control circuit 324 corrects the drive signals for ON/OFF driving the switching devices by using the error signal. By correcting the drive signals for the switching devices as described above, the control circuit 324 carries out control so that the deviation of the detection voltages from the voltage detection circuits becomes zero.

As described above, in the switching power supply in accordance with Embodiment 6 of the present invention, the voltage of the DC power supply 301 is divided into thirds by the capacitors 302, 303 and 450, and these divided voltages are applied to the capacitors 302, 303 and 450. However, in the case when the characteristics of the components constituting the half-bridge converters connected in parallel with the capacitors 302, 303 and 450 have variations or when the switching power supply is in a transient state at the start time of power supply operation, a deviation occurs among the voltages divided by the capacitors. In the conventional example, the actual values of the input voltages are detected, whereby the input voltages are prevented from being unbalanced, as described above. However, in the switching power supply in accordance with Embodiment 6 of the present invention, the voltages applied to the transformers are detected indirectly, whereby the circuit states of the half-bridge converters are detected. Since the switching power supply in accordance with Embodiment 6 is configured as described above, the switching power supply can more flexibly handle the imbalance among the input voltages of the half-bridge converters connected in series.

Next, the configuration of the voltage detection circuits 325, 326 and 420 in the switching power supply in accordance with Embodiment 6 will be described.

As an example of the voltage detection circuits 325, 326 and 420, a configuration is available wherein the current from an auxiliary winding is rectified by using a full-wave rectifier and a DC voltage is detected. In the switching power supply in accordance with Embodiment 6 having the voltage detection circuits 325, 326 and 420 configured as described above, if the input DC voltage is equally divided by the capacitors 302, 303 and 450, the voltages detected by the voltage detection circuits 325, 326 and 420 become equal to one another. Hence, the average voltage detection circuit 424 does not detect any deviation detection value and does not output any deviation signal to the control circuit 324.

If the input DC voltage cannot be divided equally by the capacitors 302, 303 and 450, a deviation occurs among the voltages detected by the voltage detection circuits 325, 326 and 420. Hence, the average voltage detection circuit 424 detects a deviation detection value, and outputs a deviation signal indicating this deviation value to the control circuit 324 via the voltage signal correction circuit 425.

In addition, as another configuration example of the voltage detection circuits 325, 326 and 420, a configuration is available wherein means for detecting the peak value of a rectangular voltage is used. In the case when the voltage detection circuits 325, 326 and 420 are configured as described above, it is necessary to prevent malfunctions due to noise. For this purpose, a snubber circuit is appropriately inserted across both ends of each of the primary windings 308a, 316a and 419a or both ends of each of the auxiliary windings 308d, 316d and 419d of the transformers 308, 316 and 419 to stabilize operation. Even in the switching power supply having the voltage detection circuits 325, 326 and 420 configured as described above, if the input DC voltage is equally divided by the capacitors 302, 303 and 450, just as in the case of the above-mentioned configuration, the voltages detected by the voltage detection circuits 325, 326 and 420 become equal to one another. On the other hand, in the case when the input DC voltage cannot be equally divided by the capacitors 302, 303 and 450, a deviation occurs among the voltages detected by the voltage detection circuits 325, 326 and 420. Hence, the average voltage detection circuit 424 detects a deviation detection value and outputs a deviation signal indicating this deviation value to the control circuit 324 via the voltage signal correction circuit 425.

The control circuit 324 is provided with a triangular signal generating circuit that generates a triangular signal for determining the cycle of the drive signal for each switching device. In addition, the control circuit 324 is provided with drive signal generating means that receives the deviation signal indicating the deviation value from the average voltage detection circuit 424 and generates the drive signal for ON/OFF operating each switching device.

As described above, in the switching power supply in accordance with Embodiment 6, the output voltage detected by the output voltage detection circuit 351 is input to the output voltage error amplifier 322 and compared with the reference voltage of the reference power supply 323 by the output voltage error amplifier 322. An error signal indicating the deviation detection voltage obtained as the result of the comparison is amplified and input to the control circuit 324.

In the method, used in the control circuit 324, for generating the drive signal for ON/OFF operating each switching device, the triangular voltage from the triangular signal generating circuit is compared with the deviation detection voltage from the output voltage error amplifier 322 by a comparator, and a pulse waveform is generated. At this time, the deviation voltage of the deviation signal from the average voltage detection circuit 424 is added to the triangular voltage or the deviation detection voltage of the output voltage error amplifier 322.

Since the switching power supply in accordance with Embodiment 6 is configured as described above, in the case when variations occur in the voltages divided by the capacitors 302, 303 and 450, the drive signals can be controlled easily so that the switching devices are ON/OFF operated as desired. Furthermore, the imbalance due to the variations in the characteristics of the components can also be handled flexibly. As a result, the switching power supply in accordance with Embodiment 6 can securely provide highly reliable DC-DC converters.

In the Embodiment 6, the configuration wherein three half-bridge-type DC-DC converters are connected in series has been described. However, the present invention is not limited to this configuration. It is obvious that the present invention can be applied to a configuration including a forward-type converter using one transistor, a flyback-type DC-DC converter, a full-bridge-type DC-DC converter or an irregular forward-type DC-DC converter in which switching transistors are connected to both terminals of a switching transformer. Even if the circuit arrangement is different as described above, the switching power supply in accordance with the present invention can be applied to a configuration including means for detecting the voltages induced in the primary windings of isolating transformers, means for comparing the detection voltages obtained from DC-DC converters and means for controlling the ON/OFF periods of the drive signals for driving switching devices. It is obvious that the switching power supply having this kind of configuration is included in the scope of the present invention.

Furthermore, in the switching power supply in accordance with Embodiment 6, the configuration comprising three DC-DC converters has been described as an example. However, the present invention is not limited to this configuration. The present invention is also applicable to switching power supplies comprising four or more DC-DC converters by using a method similar to that of Embodiment 6. It is obvious that these switching power supplies are included in the scope of the present invention.

The present invention has the following effects as made obvious by the detailed descriptions of the embodiments.

The present invention can provide a switching power supply capable of uniforming load sharing by connecting the input sides of a plurality of DC-DC converters in series, by making the input voltages of the DC-DC converters uniform and by using circuit components being inexpensive in price and low in power loss.

In the switching power supply in accordance with the present invention, the series circuit of capacitors is connected in parallel with a DC power supply, the input terminals of each DC-DC converter are connected to both terminals of each capacitor, and the output terminals thereof are connected in parallel and connected across a load. With this configuration, circuit components being inexpensive in price and low in power loss can be used to make the input voltages of the DC-DC converters uniform.

In the switching power supply in accordance with the present invention, the voltages induced in the transformers or the choke coils of the DC-DC converters are detected, the detection voltages are compared, and the deviation therebetween is used for correction processing in the control circuit. Therefore, the voltages applied to the DC-DC converters can be made uniform securely and accurately.

With the present invention, it is possible to reduce the numbers of turns of the windings of the transformers in a switching power supply having a large voltage step-down between the input and output. Hence, a switching power supply for supplying a large current and a switching power supply being limited in shape and space can be made more compact and efficient by adopting the present invention. Hence, the circuit arrangement of the switching power supply is highly versatile and useful.

Although the present invention has been described with respect to its preferred embodiments in some detail, the disclosed contents of the preferred embodiments may change in the details of the structure thereof, and any changes in the combination and sequence of the components may be attained without departing from the spirit and scope of the claimed invention.

The invention claimed is:

1. A switching power supply comprising:
(a) a plurality of capacitors for dividing the voltage of a DC power supply;
(b) a plurality of DC-DC converters, the input sides of which respectively receive the voltages divided by said plurality of capacitors and the output sides of which are connected in parallel;
(c) output voltage error detecting means for detecting the output voltage of said DC-DC converters and for generating an error signal between the output voltage and a reference voltage;
(d) input voltage deviation detecting means for detecting voltages corresponding to the input voltages of said DC-DC converters and for generating the deviation signal of the input voltages of said DC-DC converters; and
(e) control means, receiving the error signal from said output voltage error detecting means and the deviation signal from said input voltage deviation detecting means, for drive-controlling said DC-DC converters,
wherein said input voltage deviation detecting means detects voltages induced in auxiliary windings added to a transformer at the time when switching mean are in the ON state.

2. A switching power supply comprising:
(a) a plurality of capacitors for dividing the voltage of a DC power supply;
(b) a plurality of DC-DC converters, the input sides of which respectively receive the voltages divided by said plurality of capacitors and the output sides of which are connected in parallel;
(c) output voltage error detecting means for detecting the output voltage of said DC-DC converters and for generating an error signal between the output voltage and a reference voltage;
(d) input voltage deviation detecting means for detecting voltages corresponding to the input voltages of said DC-DC converters and for generating the deviation signal of the input voltages of said DC-DC converters; and
(e) control means, receiving the error signal from said output voltage error detecting means and the deviation signal from said input voltage deviation detecting means, for drive-controlling said DC-DC converters,
wherein said input voltage deviation detecting means detects voltages induced in the secondary windings of a transformer.

3. A switching power supply comprising:
(a) a plurality of capacitors for dividing the voltage of a DC power supply;
(b) a plurality of DC-DC converters, the input sides of which respectively receive the voltages divided by said plurality of capacitors and the output sides of which are connected in parallel;
(c) output voltage error detecting means for detecting the output voltage of said DC-DC converters and for generating an error signal between the output voltage and a reference voltage;
(d) input voltage deviation detecting means for detecting voltages corresponding to the input voltages of said DC-DC converters and for generating the deviation signal of the input voltages of said DC-DC converters; and
(e) control means, receiving the error signal from said output voltage error detecting means and the deviation signal from said input voltage deviation detecting means, for drive-controlling said DC-DC converters,
wherein said input voltage deviation detecting means detects voltages applied to output choke coils.

4. A switching power supply in accordance with claim 1, wherein said input voltage deviation detecting means comprises voltage detecting means for detecting the voltages applied to predetermined portions of said DC-DC converters and voltage deviation detecting means for detecting the deviation of the input voltages of said DC-DC converters detected by said voltage detecting means, and
said control means, receiving the deviation signal of said input voltage deviation detecting means and the error signal of said output voltage error detecting means, corrects drive signals for ON/OFF operating switching means so that the input voltages to said DC-DC converters are balanced and so that the deviation of said input voltage deviation detecting means becomes zero.

5. A switching power supply in accordance with claim 2, wherein said input voltage deviation detecting means comprises voltage detecting means for detecting the voltages applied to predetermined portions of said DC-DC converters and voltage deviation detecting means for detecting the deviation of the input voltages of said DC-DC converters detected by said voltage detecting means, and said control means, receiving the deviation signal of said input voltage deviation detecting means and the error signal of said output voltage error detecting means, corrects drive signals for ON/OFF operating switching means so that the input voltages to said DC-DC converters are balanced and so that the deviation of said input voltage deviation detecting means becomes zero.

6. A switching power supply in accordance with claim 3, wherein said input voltage deviation detecting means comprises voltage detecting means for detecting the voltages applied to predetermined portions of said DC-DC converters and voltage deviation detecting means for detecting the deviation of the input voltages of said DC-DC converters detected by said voltage detecting means, and said control means, receiving the deviation signal of said input voltage deviation detecting means and the error signal of said output voltage error detecting means, corrects drive signals for ON/OFF operating switching means so that the input voltages to said DC-DC converters are balanced and so that the deviation of said input voltage deviation detecting means becomes zero.

7. A switching power supply in accordance with claim 1 further comprising:
(f) N (N: an integer of 3 or more) capacitors connected in series across the input terminals, across which said DC power supply is connected; and
(g) N DC-DC converters respectively connected to said capacitors, wherein
said input voltage deviation detecting means detects voltages corresponding to the input voltages of said DC-DC converters, calculates the average value thereof and generates a deviation between said average value and the voltages corresponding to the input voltages of said DC-DC converters, and
said control means, receiving the deviation signal of said input voltage deviation detecting means and the error signal of said output voltage error detecting means, corrects drive signals for ON/OFF operating said switching means so that the input voltages to said DC-DC converters are balanced and so that the deviation of said input voltage deviation detecting means becomes zero.

8. A switching power supply in accordance with claim 2 further comprising:
(f) N (N: an integer of 3 or more) capacitors connected in series across the input terminals, across which said DC power supply is connected; and
(g) N DC-DC converters respectively connected to said capacitors, wherein
said input voltage deviation detecting means detects voltages corresponding to the input voltages of said DC-DC converters, calculates the average value thereof and generates a deviation between said average value and the voltages corresponding to the input voltages of said DC-DC converters, and
said control means, receiving the deviation signal of said input voltage deviation detecting means and the error signal of said output voltage error detecting means, corrects drive signals for ON/OFF operating said switching means so that the input voltages to said DC-DC converters are balanced and so that the deviation of said input voltage deviation detecting means becomes zero.

9. A switching power supply in accordance with claim 3 further comprising:
(f) N (N: an integer of 3 or more) capacitors connected in series across the input terminals, across which said DC power supply is connected; and
(g) N DC-DC converters respectively connected to said capacitors, wherein
said input voltage deviation detecting means detects voltages corresponding to the input voltages of said DC-DC converters, calculates the average value thereof and generates a deviation between said average value and the voltages corresponding to the input voltages of said DC-DC converters, and
said control means, receiving the deviation signal of said input voltage deviation detecting means and the error signal of said output voltage error detecting means, corrects drive signals for ON/OFF operating said switching means so that the input voltages to said DC-DC converters are balanced and so that the deviation of said input voltage deviation detecting means becomes zero.

10. A switching power supply comprising:
(a) a plurality of capacitors for dividing the voltage of a DC power supply;
(b) a plurality of DC-DC converters, the input sides of which respectively receive the voltages divided by said plurality of capacitors and the output sides of which are connected in parallel;
(c) output voltage error detecting means for detecting the output voltage of said DC-DC converters and for generating an error signal between the output voltage and a reference voltage;
(d) input voltage deviation detecting means for detecting voltages corresponding to the input voltages of said DC-DC converters and for generating the deviation signal of the input voltages of said DC-DC converters; and
(e) control means, receiving the error signal from said output voltage error detecting means and the deviation signal from said input voltage deviation detecting means, for drive-controlling said DC-DC converters;
wherein said control means comprises reference triangular signal generating means for generating a reference triangular signal and voltage comparing means for comparing said reference triangular signal with the error signal of said output voltage error detecting means, and the deviation signal of said input voltage deviation detecting means is added to the reference triangular signal or the error signal of an error amplifier and compared in voltage.

11. A switching power supply comprising:
(a) a plurality of capacitors for dividing the voltage of a DC power supply;
(b) a plurality of DC-DC converters having at least switching means, a transformer, rectifying means, a smoothing capacitor and an output choke coil, the input sides of which respectively receive the voltages divided by said plurality of capacitors and the output sides of which are connected in parallel;
(c) output voltage error detecting means for detecting the output voltage of said DC-DC converters and for generating an error signal between the output voltage and a reference voltage;
(d) voltage detecting means for detecting the voltages induced in the winding of a transformer corresponding to the input voltages of said DC-DC converters;
(e) voltage deviation detecting means for outputting the deviation signal of input voltages of said DC-DC converters, said input voltages being detected by said voltage detecting means; and (f) control means, receiving the error signal from said output voltage error detecting means and the deviation signal from said voltage deviation detecting means, for correcting drive signals for ON/OFF said operating switching means so that the deviation of said voltage deviation detecting means becomes zero.

12. A switching power supply in accordance with claim 11 further comprising:

(g) N (N: an integer of 3 or more) capacitors connected in series across the input terminals, across which said DC power supply is connected; and (h) N DC-DC converters respectively which are connected to said capacitors, and have at least switching means, a transformer, rectifying means, a smoothing capacitor and an output choke coil, wherein said voltage deviation detecting means detects voltages corresponding to the input voltages of said DC-DC converters, calculates the average value thereof and generates a deviation between said average value and the voltages corresponding to the input voltages of said DC-DC converters, and said control means, receiving the deviation signal of said voltage deviation detecting means and the error signal of said output voltage error detecting means, corrects signals for ON/OFF operating said switching means so that the input voltages to said DC-DC converters are balanced and so that the deviation of said voltage deviation detecting means becomes zero.

* * * * *